(12) United States Patent
Shingai

(10) Patent No.: US 7,813,012 B2
(45) Date of Patent: Oct. 12, 2010

(54) DOCUMENT FEEDER

(75) Inventor: Hiroyuki Shingai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1016 days.

(21) Appl. No.: 11/589,980

(22) Filed: Oct. 31, 2006

(65) Prior Publication Data

US 2007/0103740 A1    May 10, 2007

(30) Foreign Application Priority Data

Oct. 31, 2005    (JP) ............................. 2005-317474

(51) Int. Cl.
*H04N 1/04* (2006.01)
(52) U.S. Cl. .................... 358/474; 358/496; 358/497
(58) Field of Classification Search ................ 358/474, 358/496, 497; 271/291; 399/374
See application file for complete search history.

(56) References Cited

U.S. PATENT DOCUMENTS

| | | | |
|---|---|---|---|
| 5,689,793 A | 11/1997 | Kobayashi et al. | |
| 5,819,152 A | 10/1998 | Kobayashi et al. | |
| 5,826,155 A | 10/1998 | Kobayashi et al. | |
| 5,903,811 A | 5/1999 | Kobayashi et al. | |
| 5,991,592 A * | 11/1999 | Kobayashi et al. | .......... 399/374 |
| 6,151,478 A | 11/2000 | Katsuta et al. | |
| 6,161,831 A | 12/2000 | Kusakabe et al. | |

FOREIGN PATENT DOCUMENTS

| | | |
|---|---|---|
| JP | 8-085649 | 4/1996 |
| JP | 8-133551 | 5/1996 |
| JP | 10-087187 | 4/1998 |
| JP | 11-157756 | 6/1999 |
| JP | 11-263540 | 9/1999 |

OTHER PUBLICATIONS

Office Action in related Application No. JP2005-317474, dated Jul. 8, 2008.

\* cited by examiner

*Primary Examiner*—Houshang Safaipour
(74) *Attorney, Agent, or Firm*—Banner & Witcoff, Ltd

(57) ABSTRACT

An automatic document feeder includes: an inlet; an outlet; a transfer system configured to transfer a document from the inlet to the outlet; an input transfer path configured to guide a document during transfer from the inlet passed a scanning point to an end point positioned above the inlet; an output transfer path configured to guide the document during transfer from the end point passed the scanning point to the outlet; a secondary system configured to feed the document from the inlet; and a drive system configured to drive the transfer elements and the secondary system, wherein the drive system controls the transfer system such that, in at least some instances, operation of the secondary system is independent of operation of the transfer system.

12 Claims, 18 Drawing Sheets

DOCUMENT FEEDER

CROSS-REFERENCE TO THE RELATED APPLICATION(S)

This application is based upon and claims priority from prior Japanese Patent Application No. 2005-317474 filed on Oct. 31, 2005, the entire contents of which are incorporated herein by reference.

TECHNICAL FIELD

Illustrative aspects of the present invention relate to a document feeder suited for the double-sided reading of documents.

BACKGROUND

In the prior art, in an image reading apparatus which is used in a copier, a scanner, a multi-function apparatus having the functions of the former is known to have an automatic document feeder called the ADF (Auto Document Feeder) for transferring the documents from an input tray through a transfer path to an output tray. There is also known an automatic document feeder for reading a document having its two first and second sides printed. In this device, the document is reversed at its leading end and trailing end by reversible rollers while it is being transferred. (for example, see JP-A-8-85649).

FIG. 17 shows a transfer route of the automatic document feeder of the prior art. As shown in FIG. 17, a document P placed on an input tray 100 with the first side (first page) thereof facing upward is fed to a feed path 102 by a feed roller 101. In the feed path 102, the document P is fed to feed rollers 103 which are suitably disposed according to cases. When the document P passes through a scanning position X, the first side of the document P is scanned by an image reading element such as a CCD or a CIS. When a sensor detects the trailing end of the document P after the first side thereof is scanned, reversible rollers 104 are stopped while nipping the trailing end of the document.

As shown in FIG. 18, bidirectional feed path the reversible rollers 104 reverse the transfer direction of the nipped document P to a return path 105. The document P is fed from the bidirectional feed path 105 again to a side upstream of the scanning position X. The leading and trailing ends of the document P are reversed. The document P is fed by the feed rollers 103, and when the document P passes through the scanning position X, the second side of the document P is scanned by the image read unit. When a sensor detects the trailing end of the document P after the second side of the document P is scanned, the reversible rollers 104 are again stopped in a state where the trailing end of the document P is nipped. Afterwards, the document P is sent back along the return path 105. When the document P is moved from the return path 105 again into the feed path 102, the document P is held in a state where the leading and trailing ends of the document P are reversed once more, that is, the first side of the document P is opposed to the scanning position X. The document P is delivered along the feed path 102 and is discharged into an output tray 106 with the first side thereof facing downward. As a result, both the first and second sides of the document P are scanned and the document P is discharged to the output tray 106 in the order that the sheets of the document P were placed on the input tray 100.

SUMMARY

Illustrative aspects of the invention relate to a document feeder which is capable of feeding a document for double-sided reading and capable of maintaining a placement state of a document existing on a sheet feed tray, even when a leading end of a document projected from a bidirectional feed path is contacted with the document placing on the input tray.

Aspects of the invention relate to an automatic document feeder including: (a) an inlet; (b) an outlet; (c) a transfer system configured to transfer a document from the inlet to the outlet; (d) an input transfer path configured to guide a document during transfer from the inlet passed a scanning point to an endpoint positioned above the inlet; (e) an output transfer path configured to guide the document during transfer from the end point passed the scanning point to the outlet; (f) a secondary system configured to feed the document from the inlet; (g) and a drive system configured to drive the transfer elements and the secondary system, (h) wherein the drive system controls the transfer system such that, in at least some instances, operation of the secondary system is independent of operation of the transfer system.

BRIEF DESCRIPTION OF THE DRAWINGS

These and other aspects of the present invention will be made more fully apparent from the following detailed description taken in conjunction with the accompanying drawings, in which.

DETAILED DESCRIPTION

Now, description will be given below of an image read apparatus 1 according to an aspect of the invention, with reference to the accompanying drawings. The present aspect is an example of the invention and thus the present aspect can be modified without departing from the spirit or scope of the invention.

Figure 1:
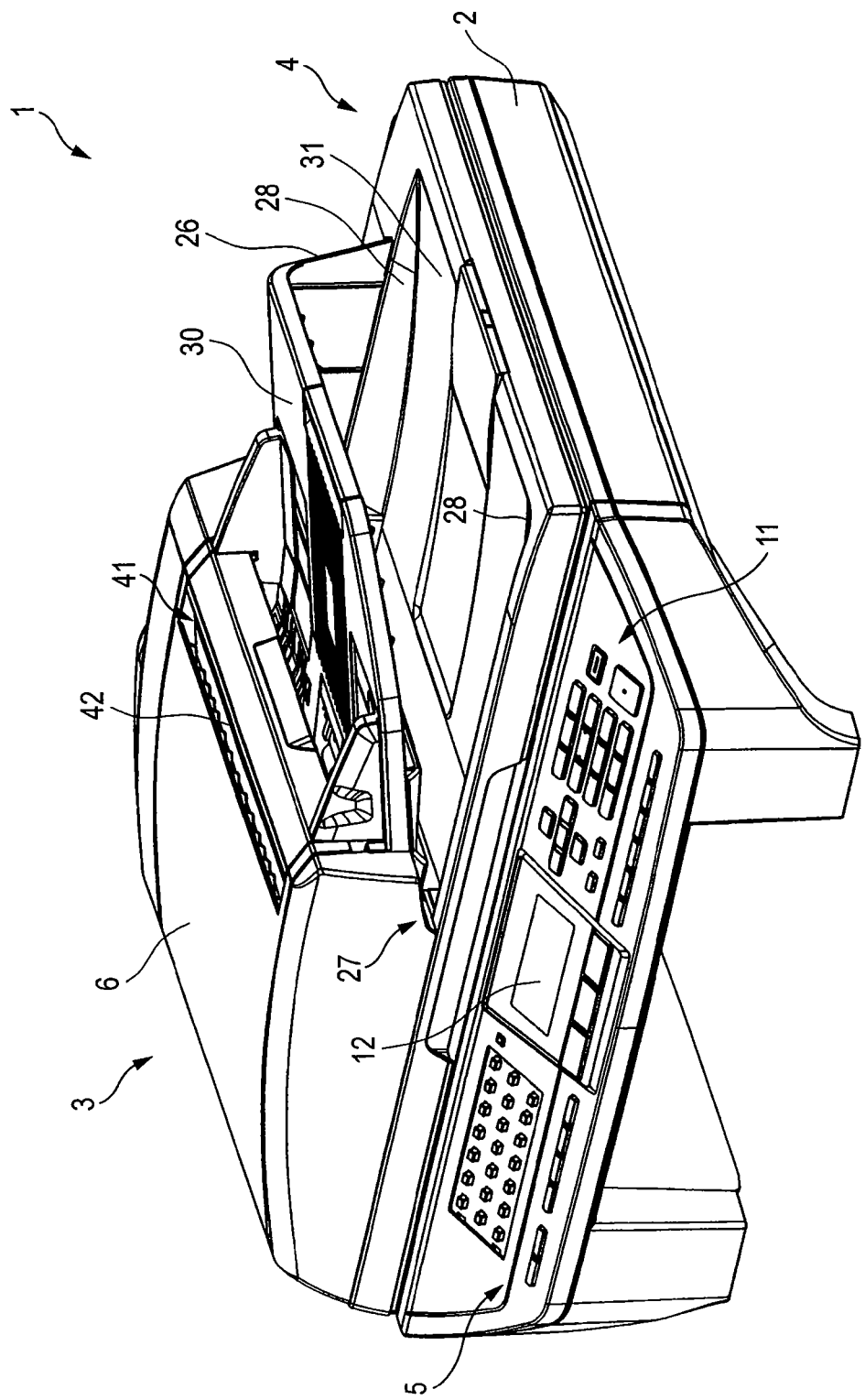
FIG. 1 is a perspective view of the external structure of an image read apparatus 1 according to an exemplary aspect of the invention.
Figure 2:
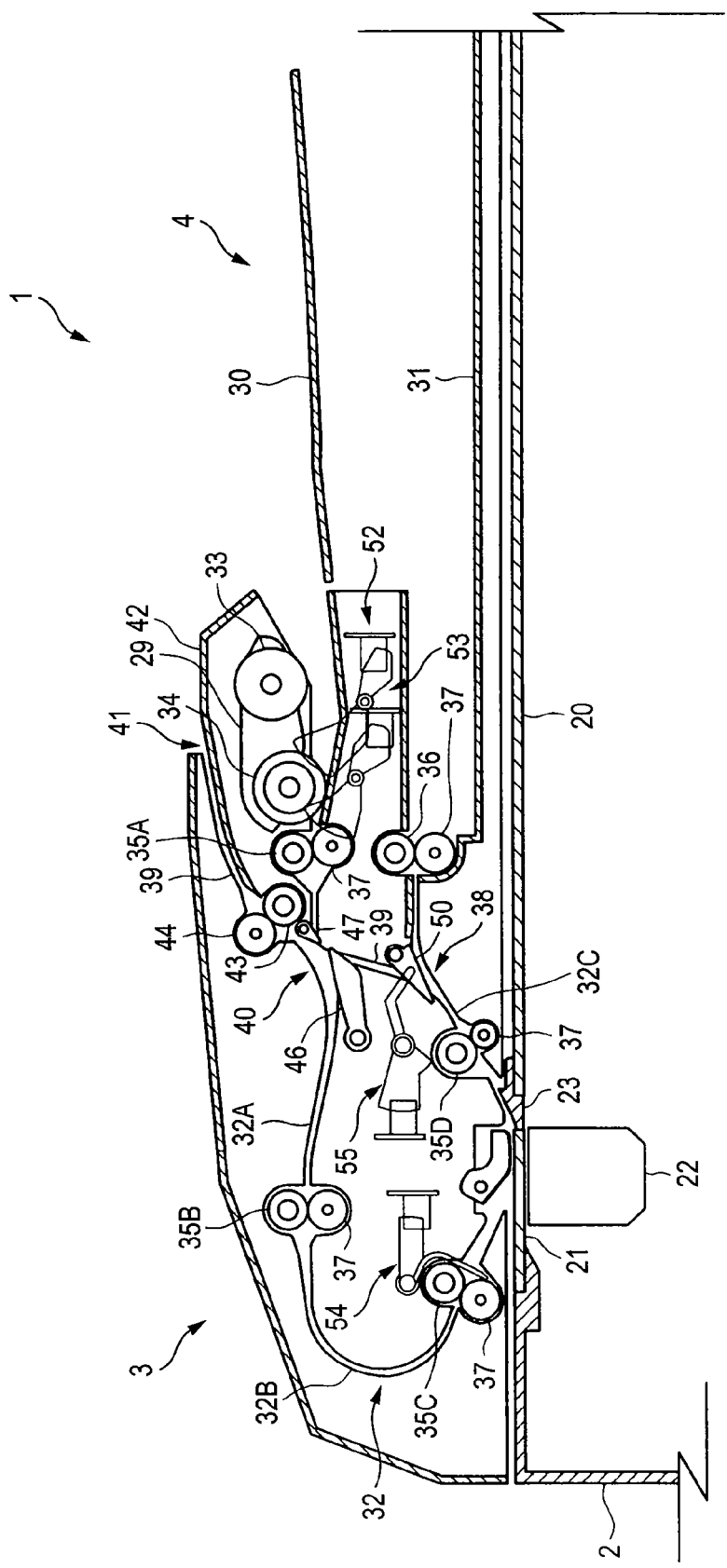
FIG. 2 is a sectional view of the internal structure of the image read apparatus 1.

FIG. 1 shows the structural of the appearance of the image read apparatus 1 according to the aspect of the invention. FIG. 2 shows the structure of the main interior portions of the image read apparatus 1. The present image read apparatus 1 can be realized as an image read portion which has a scanner function integrated therewith and used to read the images of a document, for example, in a copier, a facsimile, a scanner, and a multi-function device (MFD) having an integrated scanner function.

As shown in FIGS. 1 and 2, the present image read apparatus 1 is structured such that a document cover 4 is openably and closably mounted on a document placing table p 2 The document cover includes an ADF 3 functioning as an automatic document feed mechanism. The document placing table 2 is a flatbed scanner (FBS).

An operation panel 5 is disposed on the front side of the document placing table 2. The operation panel 5 includes various operation keys 11 and a liquid crystal display part 12. A user can input a desired instruction using the operation panel 5. For example, the input of "Start" showing the commencement of reading a document and "Stop" showing the termination of such reading, as well as the choice of a one-sided reading mode or a double-sided reading mode can be carried out using the operation keys 11. The CPU receives these given inputs, the image read apparatus 1 carries out a given operation. The image read apparatus 1 can also be operated by instructions other than the instructions inputted to the operation panel 5. The image read apparatus 1 can also be connected to a computer and thus can be operated by instructions which are transmitted thereto from the computer through a printer driver, a scanner driver, or the like.

As shown in FIG. 2, on the document placing table 2, and more specifically, on the top surface thereof facing the document cover 4, there are disposed platen glass members 20, 21. When the document cover 4 is opened, the platen glass members 20, 21 are exposed as the top surface of the document placing table 2. When the document cover 4 is closed, the whole of the top surface of the document placing table 2 including the platen glass members 20, 21 is covered by the document cover 4. In the interior of the document placement placing table 2, there is incorporated an image reader 22 in such a manner as to be opposed to the platen glass members 20, 21.

The platen glass member 20 is a member on which a document can be placed when the image read apparatus 1 is used as an FBS. For example, the platen glass member 20 may be composed of a transparent glass plate. In the center of the top surface of the document placing table 2, there is formed an opening from which the platen glass member 20 can be exposed, whereby the area of the platen glass member 20 that is exposed from the opening provides a document read area in the FBS.

The platen glass member 21 functions as a scanning position when the ADF 3 of the image read apparatus 1 is used, and as an example, may be composed of a transparent glass plate. In the scanning position of the document placing table 2, there is formed an opening from which the platen glass member 21 can be exposed. The platen glass member 21 exposed from the opening is extended in the depth direction of the image read apparatus 1 correspondingly to the length in the main scanning direction of the image reader 22.

A positioning member 23 is interposed between the platen glass members 20 and 21. The positioning member 23 is a long flat-plate-shaped member which is extended in the depth direction of the image read apparatus 1 similarly to the platen glass member 21. When a document is placed onto the platen glass member 20 serving as the document placement surface of the FBS, the positioning member 23 is used as the positioning reference of the document. For this purpose, on the top surface of the positioning member 23, there are disposed indications for indicating the position of the center as well as the positions of the two ends of various document sizes such as A4 size and B5 size. On the top surface of the positioning member 23, there is further formed a guide surface by which a document passing on the platen glass 21 by the ADF 3 can be caught up and deflected and also can be then returned to the ADF 3.

The image reader 22 is an image sensor which radiates the light from a light source onto the document through the platen glass members 20, 21, gathers the reflected light from the document onto a light receiving element, and converts the light to electric signals. The image reader unit 22 can be forted of, for example, a close-contact type image sensor (CIS) or a charge coupled device (CCD) of a reduction optical system. The image reader 22 is disposed below the platen glass members 20, 21. The image reader 22 can be moved back and forth by a belt drive mechanism. On receiving the drive force of a carriage motor, the image reader 22 can be moved back and forth parallelly to the platen glass members 20, 21.

The document cover 4 includes the ADF 3 which successively feeds a document from an input tray 30 through a feed path 32 to an output tray 31. In the feed process that is carried out by the ADF 3, the document passes through the scanning position on the platen glass member 21 and the images of the document can be read by the image reader 22 which is located below the platen glass member 21.

FIGS. 1 and 2 show that the document cover 4 includes the input tray 30 and output tray 31. The input tray 30 is disposed on the output tray 31 On the input tray 30, there can be placed a document the images of which are to be scanned by the ADF 3. Two or more sheets of documents are placed onto the input tray 30 in such a manner that they are piled on top of one another with the first sides thereof facing upward and the leading ends thereof in the feed direction are inserted into the feed path 32. The apparatus back side of the input tray 30 is curved downward to thereby form a protection wall 26. The lower end of the protection wall 26 is connected to the top surface of the document cover 4. When the document cover 4 is opened with respect to the document placing table 2, the protection wall 26 prevents the document on the output tray 31 from falling down. Downward from the apparatus front side of the input tray 30, there is formed a groove 27 in a part of the body of the ADF 3. This groove 27 enhances the visibility of the document from the apparatus front surface side when the document is discharged to the output tray 31. Especially, a document of a small size is generally difficult to see due to the input tray 30. The groove 27 creates a space between the input tray 30 and output tray 31 to thereby be able to enhance the visibility of a document, especially, that of a small-sized document.

The output tray 31 is disposed below the output tray 30 while being spaced apart from the input tray 30 in the vertical direction. The output tray 31 is formed integrally with the top surface of the document cover 4. Documents with images which have been scanned and which have been discharged from the ADF 3 are separated from documents existing on the input tray 30, and are piled on the output tray 31 on top of one another with their first sides facing downward. The two side portions 28 of the output tray 31, which are respectively composed of the apparatus front side and apparatus back side of the output tray 31, are formed as slanting surfaces which gradually rise upwardly toward respective side. When the documents discharged to the output tray 31 are to be out therefrom, while holding the documents from above, the documents can be slid along the slanting surfaces of the two side portions 28 and can be taken out. The two side portions 28 facilitate removal of the documents from the sheet discharge tray 31.

As shown in FIG. 2, in the interior of the ADF 3, in order to be able to connect together the sheet feed tray 30 and sheet discharge tray 31 through the scanning position on the platen glass member 21, there is formed the feed path 32, the longitudinal section view of which has a substantially U-like shape facing sideways. The feed path 32 is continuously formed by a member, a guide plate, a guide rib and the like respectively constituting the main body of the ADF 3, in the form of a path having a given width which allows the document to pass therethrough. In this manner, since the input tray 30 and sheet discharge tray 31 are disposed in the upper and lower stages and also since the feed path 32 having a sideways facing, substantially U-shaped longitudinal section is formed so as to be able to connect the two trays together, the width of the ADF 3 can be narrowed and thus the size of the ADF 3 can be reduced.

The feed path 32 is extended from the input tray 30 toward one end side (in FIG. 2, toward the left side) of the document cover 4, and is curved downward in a reversing manner to reach the scanning position on the platen glass member 21, and also extended from the scanning position toward the output tray 31, whereby the longitudinal section view of the feed path 32 has a substantially U-like shape facing sideways. The feed path 32 is mainly composed of three portions, an upper portion 32A and a lower portion 32C which respectively constitute the straight line portions of the upper and lower stages forming the substantially U-like shape, and a curved portion 32B curved in such a manner so as to connect the upper and lower portions 32A and 32C. The feed path 32 is used as a common document feed path through which the document can be fed by the ADF 3 not only when the images of one side of the document are read, but also when the images of both sides of the document are read.

The feed path 32 includes a feed unit for feeding documents existing on the input tray 30 to the feed path 32 and a document feed unit for feeding the documents from the input tray 30 to the output tray 31. In detail, as shown in FIG. 2, the feed unit is composed of a pick-up roller 33 and a separation roller 34 respectively provided in the feed path 32. The document feed unit is composed of feed rollers 35A, 35B, 35C, 35D, a sheet discharge roller 36, and respective pinch rollers 37 to be pressure contacted with the feed rollers 35A, 35B, 35C and 35D. A drive force is transmitted from a motor 67 (a drive source; see FIG. 6) to the respective rollers that constitute the feed unit and the document feed unit.

As shown in FIG. 2, the pick-up roller 33 and separation roller 34 are disposed in the most upstream portion of the feed path 32, that is, in the neighborhood of the input tray 30. The pick-up roller 33 is rotatably provided on the leading end portion of an arm 29 having its base end side pivotally supported on a shaft which pivotally supports the separation roller 34. The separation roller 34 is rotatably provided at a position spaced from the pick-up roller 33 in the sheet feed direction in such a manner that it is in contact with the opposed surfaces of the feed path 32. When the drive force from the motor 67 is transmitted thereto, the pick-up and separation rollers 33 and 34 can be driven and rotated. The arm 29 can also be moved up and down when the drive force is transmitted thereto from the motor 67. The pick-up and separation rollers 33 and 34 have the same diameter and can be rotated at the same peripheral speed. At the opposite position of the separation roller 34, there is disposed a friction pad which can be pressure contacted with the roller surface of the separation roller 34 to separate the document by means of friction.

The feed rollers 35A, 35B, 35C and 35D are respectively disposed at different positions in the feed path 32. According to the present aspect, the feed roller 35A is disposed on the immediate downstream side of the separation roller 34, the feed roller 35B is disposed in the upper portion 32A of the feed path 32, the feed roller 35C is disposed on the immediate upstream side of the scanning position in the lower portion 32C of the feed path 32, and the feed roller 35D is disposed on the immediate downstream side of the scanning position in the lower portion 32C of the feed path 32. This arrangement is given an example, and the number and arrangement of the feed rollers 35A, 35B, 35C and 35D can be changed while still maintaining the spirit and scope of the invention.

At the respective opposite positions of the feed rollers 35A, 35B, 35C and 35D, there are disposed the pinch rollers 37. The shafts of the pinch rollers 37 are respectively elastically energized by their associated springs, whereby the pinch rollers 37 are respectively pressure contacted with the roller surfaces of the feed rollers 35A, 35B, 35C and 35D. When the feed rollers 35A, 35B, 35C and 35D are rotated, the pinch rollers 37 pressure contacted with these rollers are also rotated to follow the feed rollers. The pinch rollers 37 respectively press the document against the feed rollers 35A, 35B, 35C and 35D to thereby transmit the rotation forces of the feed rollers 35A, 35B, 35C and 35D to the document.

The sheet discharge roller 36 is disposed in the neighborhood of the furthest downstream portion of the feed path 32, and similar to the feed rollers 35A, 35B, 35C and 35D, when the drive force from the motor is transmitted to the sheet discharge roller 36, the sheet discharge roller 36 is driven and rotated. At the opposite position of the sheet discharge roller 36, there is also disposed a pinch roller 37, which is elastically energized by a spring and is thereby pressure contacted with the sheet discharge roller 36.

A bidirectional feed path 39 is connected to a connecting position 38 in the lower portion 32C of the feed path 32. The bidirectional feed path 39 is a path which, when reading both sides of the document, reverses the leading and trailing ends of the document with the first surface thereof read at the scanning position and then feeds again the document from the portion of the feed path 32 downstream from the scanning position to the portion of the feed path 32 upstream from the scanning position. The bidirectional feed path 39 is extended obliquely upward from the connecting position 38 toward the upper side of the input tray 30, and crosses the upper portion 32A of the feed path 32. The document, which has been switchback-fed from a crossing position 40 between the upper portion 32A and bidirectional feed path 39, is then returned back to the feed path 32.

The terminal end 41 of the bidirectional feed path 39 is opened on the top surface of the ADF 3. On the side of the input tray 30 that extends from the terminal end 41 of the bidirectional feed path 39, there is formed a document support portion 42 in such a manner that it extends from the lower guide surface of the terminal end 41. The document support portion 42 is used to support the document projected from the terminal end 41 of the bidirectional feed path 39, and forms the upper cover 6 (see FIG. 1) of the ADF 3 on the upper side of the feed roller 33 and separation roller 34. The upper cover 6 is formed so as to be able to cover the whole of the ADF 3 including the feed roller 33 and separation roller 34, while being able to be opened and closed. The document support portion 42, which is formed as a portion of the upper cover 6, is extended from the terminal end 41 toward the input tray 30 up to the upstream side of the sheet feed position to which the documents are fed by the sheet feed roller 33 and separation roller 34. Thanks to this structure, in the double-sided reading operation, a portion of the document which has entered the bidirectional feed path 39 and is projected from the terminal end 41 outwardly from the ADF 3, can be supported by the document support portion 41. Also, when the upper cover 6 is opened, the feed path 32 and bidirectional feed path 39 within the ADF 3 are exposed in part, thereby enabling execution of a maintenance operation such as a jam removing operation.

On the side of the bidirectional feed path 39 that extends to the terminal end 41 from the crossing position 40, there is disposed a reversible roller 43. When a drive force is transmitted thereto from the motor 67, the reversible roller 43 can be driven and rotated in both forward and backward directions (a pulling direction and a returning direction). A pinch roller 44 is arranged at the opposing position of the reversible roller 43. Because the shaft of the pinch roller 44 is elastically energized by a spring, the pinch roller 44 is pressure contacted with the roller surface of the reversible roller 43, and as the reversible roller 43 is rotated, the pinch roller 44 is rotated to follow the reversible roller 43. The pinch roller 44 presses the document against the reversible roller 43, whereby the rotational force of the reversible roller 43 is transmitted to the document. The reversible roller 43 and pinch roller 44 cooperate together in realizing a switchback feed unit which switchback-feeds the document.

Figure 3:
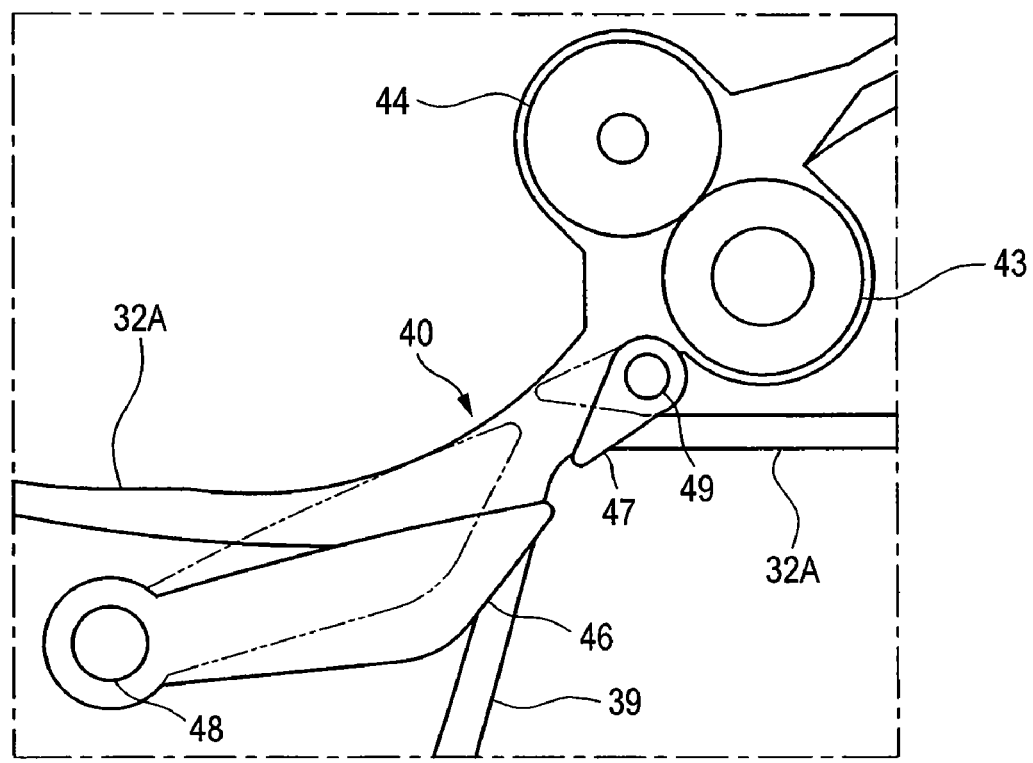
FIG. 3 is an enlarged view of the structure of a crossing position 40.

Now, FIG. 3 is an enlarged view of the structure of the neighboring portion of the crossing position. As shown in FIGS. 2 and 3, in the crossing position 40, there are disposed a guide flap 46 and a guide flap 47 which are used to guide the document to a desired feed path. Specifically, the guide flap 46 can be rotated in a given range about a shaft 48 provided at a corner portion (in FIG. 3, on the lower left side) between the scanning position side of the feed path 32 in the crossing position 40 and the connecting position 38 side of the bidirectional feed path 39. The guide flap 46 is composed of a vane-shaped flat plate, and the leading end of the guide flap 46 is projected into the crossing position 40. In FIG. 3, only one guide flap 46 is shown. However, two or more guide flaps 46 may be disposed having the same shape at given intervals in the width direction of the feed path 32 (in FIG. 3, in the figure sheet vertical direction, or in the apparatus depth direction), in such a manner that the two or more guide flaps 46 may be rotated as an integral body.

When the guide flap 46 is rotated about the shaft 48, the guide flap 46 changes it position between a third guide position shown by a solid line in FIG. 3 and a fourth guide position shown by a chain double-dashed line in FIG. 3. Since the guide flap 46 is contacted with, for example, guide members provided in the feed path 32 or bidirectional feed path 39, the guide flap 46 is prevented from rotating downward in FIG. 3 from the third guide position and also from rotating upward in FIG. 3 from the fourth guide position. When the guide flap 46 is in the third guide attitude, not only is the feed path, which extends from the input tray 30 side (in FIG. 3, the right side) of the feed path 32 to the scanning position side (in FIG. 3, the left side), allowed to be continuous, but also the feed path extending from the feed path 32 to the connecting position 38 side (in FIG. 3, the lower side) of the bidirectional feed path 39 is closed. As a result, the document, which has arrived at the crossing position 40 from the input tray 30 side of the feed path 32, is allowed to enter the scanning position side of the feed path 32 and is prevented from entering the connecting position 38 side of the bidirectional feed path 39. Also, the document, which has reached the crossing position 40 from the terminal end 41 side (in FIG. 3, the upper side) of the bidirectional feed path 39, is allowed to enter the scanning position side of the feed path 32 and is prevented from entering the connecting position 38 side of the bidirectional feed path 39.

When the guide flap 46 takes the fourth position, the feed path extending from the connecting position 38 side of the bidirectional feed path 39 to the terminal end 41 side is allowed to be continuous, whereas the feed path extending from the connecting position 38 side of the bidirectional feed path 39 to the scanning position side of the feed path 32 is closed. As a result, the document, which has arrived at the crossing position 40 from the connecting position 38 side of the bidirectional feed path 39, is allowed to advance to the terminal end 41 side of the bidirectional feed path 39, whereas it is prevented from advancing to the scanning position side of the feed path 32.

The switching of the feed path by the guide flap 46 is achieved by the contact of the document with the guide flap 46. The guide flap 46 is normally held at the third position as shown by a solid line in FIG. 3, due to its own weight or due to the energizing force of an elastic member such as a spring. When the document being delivered from the connecting position 38 toward the crossing position 40 along the bidirectional feed path 39 is contacted with the guide flap 46, the guide flap 46 is rotated in such a manner that it is pushed aside upwardly in FIG. 3, so that the guide flap 46 takes the fourth position as shown by a chain double-dashed line in FIG. 3. On the other hand, the document being delivered from the terminal end 41 side of the bidirectional feed path 39 to the crossing position 40 is contacted with the guide flap 46, but since the guide flap 46 is prevented from rotating downward in FIG. 3 from the third guide position, the document is guided by the guide flap 46 to advance to the scanning position side along the upper portion 32A of the feed path 32. As to the vane shape of the guide flap 46, there is employed a shape which not only can easily change the position of the guide flap 46 when it is contacted by the document being delivered from the connecting position 38 side of the bidirectional feed path 39 to the crossing position 40, but also allows the document being delivered from the terminal end 41 side of the bidirectional feed path 39 to the crossing position 40 to be easily guided to the scanning position side of the feed path 32. In this manner, when the guide flap 46 is formed such that it is able to change its position due to the contact of the document with the guide flap 46, it is not necessary to change the position of the guide flap 46 positively by applying a drive force from the motor 67, which makes it possible to realize the guide flap 46 with a simple structure.

Now, the guide flap 47 is disposed in such a manner that it can be rotated in a given range about a shaft 49 provided in a corner portion (in FIG. 3, on the upper side) between the input tray 30 side of the feed path 32 and the terminal end 41 side of the bidirectional feed path 39. The guide flap 47 is composed of a flat plate having a vane-like shape, while the leading end of the guide flap 47 is projected into the crossing position 40. In FIG. 3, there is shown only one guide flap 47. However, two or more guide flaps 47 may disposed having the same shape at given intervals in the width direction of the feed path 32, the two or more guide flaps 47 capable of being rotated together integrally.

When the guide flap 47 is rotated about the shaft 49, the position of the guide flap 47 can be changed to a fifth guide position as shown by a solid line in FIG. 3 and a sixth guide position as shown by a chain double-dashed line in FIG. 3. When the guide flap 47 is contacted with, for example, the guide members of the feed path 32 or bidirectional feed path 39, the guide flap 47 is prevented from rotating to the right side (in FIG. 3) of the fifth guide position and is also prevented from rotating upward (in FIG. 3) from the sixth guide position. When the guide flap 47 is in the fifth guide position, not only the feed path extending from the terminal end 41 side of the bidirectional feed path 39 to the scanning position side of the feed path 32 is allowed to be continuous, but also the feed path extending from the connecting position 38 side of the bidirectional feed path 39 to the input tray 30 side of the feed path 32 is closed. As a result, the document, which has arrived at the crossing position 40 from the terminal end 41 side of the bidirectional feed path 39, is allowed to advance to the scanning position side of the feed path 32, whereas the document is prevented from advancing to the input tray 30 side. Also, the document having arrived at the crossing position 40 from the connecting position 38 side of the bidirectional feed path 39 is allowed to advance to the terminal end 41 side of the bidirectional feed path 39, whereas the document is prevented from advancing to the input tray 30 side of the feed path 32.

On the other hand, when the guide flap 47 is in the sixth guide position, not only the feed path from the input tray 30 side of the feed path 32 to the scanning position side is allowed to be continuous, but also the feed path from the input tray 30 side of the feed path 32 to the terminal end 41 side of the bidirectional feed path 39 is closed. As a result, the document, which has arrived at the crossing position 40 from the input tray 30 side of the feed path 32, is allowed to advance to the scanning position side of the feed path 32 but is prevented from advancing to the terminal end 41 side of the bidirectional feed path 39.

The switching of the feed path by the guide flap 47 is attained by the contact of the document with the guide flap 47. The guide flap 47 is normally held at the fifth guide position as shown by a solid line in FIG. 3, due to its own weight or due to the energizing force of an elastic member such as a spring. When the document being delivered from the input tray 30 side of the feed path 32 is contacted with the guide flap 47, the guide flap 47 is rotated in such a manner that it pushed aside to the left side (in FIG. 3), so that it takes the sixth guide position as shown by a chain double-dashed line in FIG. 3. On the other hand, even if the document, which has been delivered from the connecting position 38 of the bidirectional feed path 39 to the crossing position 40, is contacted with the guide flap 47, because the guide flap 47 is prevented from rotating to the right side (in FIG. 3) from the fifth guide attitude, the document is guided by the guide flap 47 so as to advance to the terminal end 41 side of the bidirectional feed path 39. As to the vane shape of the guide flap 47, there is employed a shape which not only can easily change the position of the guide flap 47 when it is contacted by the document being delivered from the input tray 30 side of the feed path 32 to the crossing position 40, but also allows the document being delivered from the connecting position 38 side of the bidirectional feed path 39 to the crossing position 40 to be easily guided to the crossing position 40 from the connecting position 38 of the bidirectional feed path 39. In this manner, when the guide flap 47 is formed such that it is able to change its position due to the contact of the document with the guide flap 47, it is not necessary to change the position of the guide flap 47 positively by applying a drive force from a motor or the like, which makes it possible to realize the guide flap 47 with a simple structure.

Figure 4:
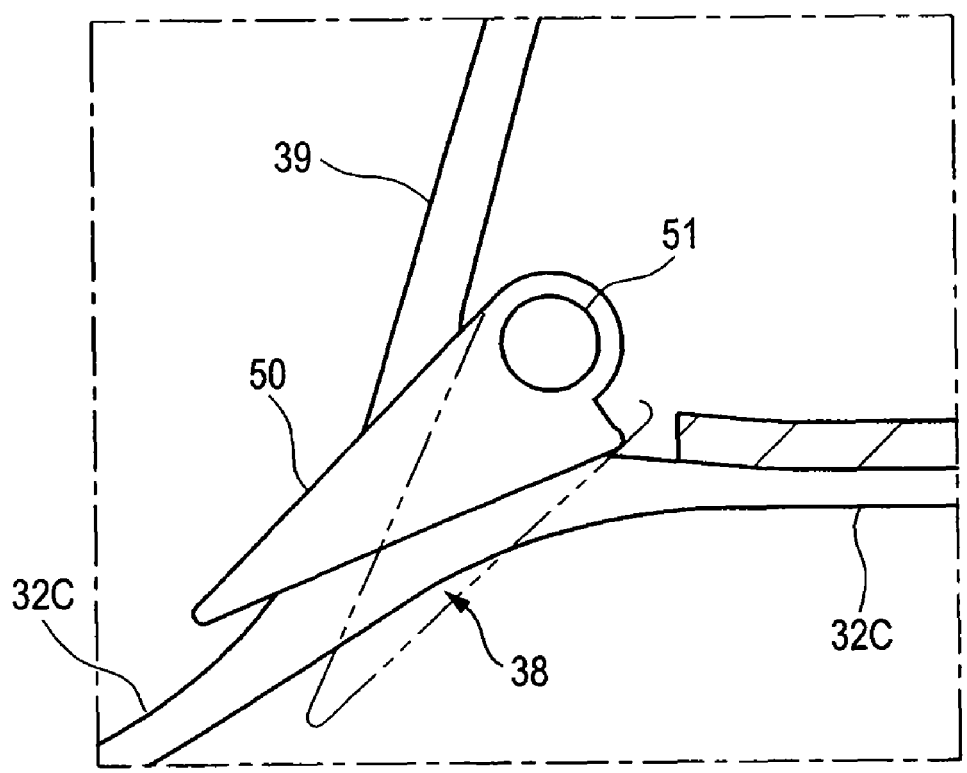
FIG. 4 is an enlarged view of the structure of a connecting position 38.

FIG. 4 is an enlarged view of the structure in the vicinity of the connecting position 38. As shown in FIGS. 2 and 4, a guide flap 50 is disposed in the connecting position 38. The guide flap 50 can be rotated about a shaft 51, and when a drive force is transmitted thereto from the motor 67, the guide flap 50 can be rotated to a first guide position as shown by a solid line in FIG. 4 and a second guide position as shown by a chain double-dashed line in FIG. 4. When the guide flap 50 is contacted with, for example, the guide member of the feed path 32 or bidirectional feed path 39, it is prevented from rotating upward (in FIG. 4) from the first guide attitude and is also prevented from rotating downward (in FIG. 4) from the second guide position. When the guide flap 50 is held at the first guide position, the feed path from the scanning position side (in FIG. 4, the left side) of the feed path 32 to the output tray 31 side (in FIG. 4, the right side) is allowed to be continuous. As a result, the document having passed through the scanning position is guided in the connecting position 38 toward the output tray 31 along the lower portion 32C of the feed path 32. When the guide flap 50 is held at the second position, the feed path from the side of the lower portion 32C of the feed path 32 existing downstream of the scanning position to the bidirectional feed path 39 is allowed to be continuous. As a result, the document having passed through the scanning position is guided in the connecting position 38 in such a manner that it advances into the bidirectional feed path 39. In this manner, the guide flap 50 is disposed in such a manner that it can guide the document in the connecting position 38 to either the feed path 32 or bidirectional feed path 39. In FIG. 4, there is shown only one guide flap 50. However, two or more guide flaps 50 may be disposed having the same shape at given intervals in the width direction of the feed path 32, while being able to be rotated together integrally.

As shown in FIG. 2, in the feed path 32 and bidirectional feed path 39, there are disposed two or more sensors which are used to detect the feeding operation of the document. In the feed path 32, just upstream and just downstream of the separation roller 34, there are disposed a first front sensor 52 and a second front sensor 53 (a first document sensor), respectively. Just upstream of the scanning position, a rear sensor 54 (a second document sensor) is disposed. A feed distance from the nip position of the separation roller 34 of the feed path 32 to the rear sensor 54 is longer than the feed-direction length of the maximum document, both sides of which can be read by the image read apparatus 1. The present image read apparatus 1 is capable of reading both sides of a document of up to A4 size (length×width=297 mm×210 mm) of a longitudinal feed type and thus the feed path 32 is formed such that the feed distance from the second front sensor 53 to the rear sensor 54 is longer than 297 mm. Therefore, there is no possibility that the second front sensor 53 and rear sensor 54 can detect a single sheet of A4-size document at the same time. Between the connecting position 38 and crossing position 40 of the bidirectional feed path 39, there is interposed a switchback sensor 55. These sensors are respectively composed of so called optical sensors, and they are similar in structure except that their detectors are different in shape from one another due to their different detecting positions. Thus, by way of illustration, description will be given below of the structure of the first front sensor 52.

Figure 5:
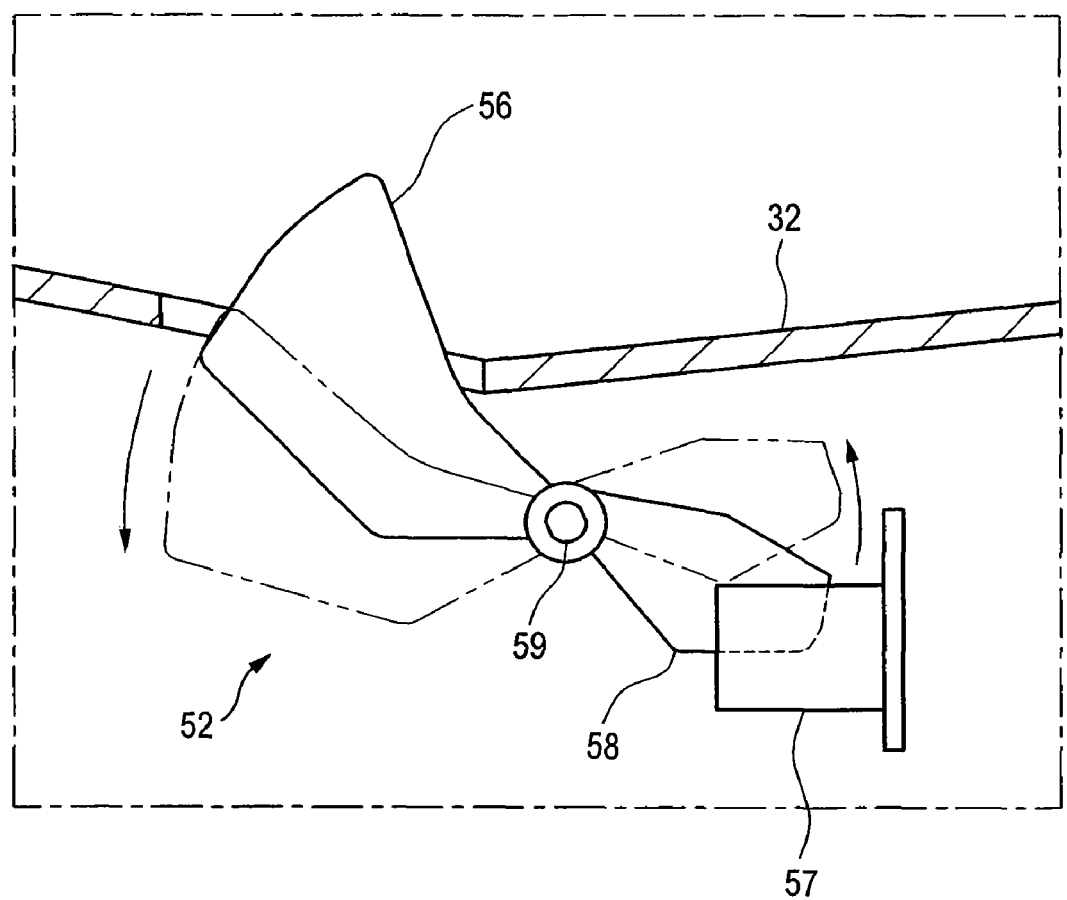
FIG. 5 is an enlarged view of the structure of a first front sensor 52.

FIG. 5 is an enlarged view of the structure of the first front sensor 52. As shown in FIG. 5, the first front sensor 52 includes: a detector 56 which projects out from the lower surface of the feed path 32, and when it is contacted with the document, can be rotated so as to retreat from the feed path 32, and a photo-interrupter 57 used to detect the rotational movement of the detector 56. The detector 56 includes a shielding portion 58 which is formed integrally with the detector 56 and can be detected by the photo-interrupter 57, while the detector 56 can be rotated about a shaft 59. The detector 56 is elastically energized by an energizing unit such as a spring (not shown) to the position from which the detector 56 projects into the feed path 32 (in a clockwise direction in FIG. 5). In a state where no external force is applied to the detector 56, as shown by a solid line in FIG. 5, the detector 56 projects into the feed path 32 and the shielding portion 58 is situated between the light emitting portion and light receiving portion of the photo-interrupter 57. Thus, the light transmission of the photo-interrupter 57 is cut off, to thereby turn off the first front sensor 52.

When a document is placed onto the input tray 30, the document is contacted with the detector 56 to thereby rotate the detector 56 so as to retreat from the feed path 32. As the detector 56 is rotated, the shielding portion 58 is also rotated, and as shown by a chain double-dashed line in FIG. 5, the shielding portion 58 is caused to emerge from between the light emitting and receiving portions of the photo-interrupter 57. As a result of this, the cutoff of the light transmission of the photo-interrupter 57 is removed to thereby turn on the first front sensor 52. Depending on the on/off state of the first front sensor 56, it can be detected whether or not a document is placed on the input tray 30.

The second front sensor 53, which is disposed just downstream of the separation roller 34, is used to detect the leading or trailing end of the document fed to the feed path 32 depending on its own on/off state. For example, through detection of the leading end of the document by the second front sensor 53, it can be checked whether or not the document has been fed from the input tray 30 to the feed path 32. Also, by monitoring the number of rotations of the feed rollers 35A, 35B, 35C and 35D after detection of the trailing end of the document by the second front sensor 53 using an encoder or from the number of steps of the motor 67, the position of the leading or trailing end of the document in the feed path 32 can be judged.

The rear sensor 54 disposed just upstream of the scanning position is a sensor which, according to its own on/off state, detects the leading and trailing ends of a document being fed along the feed path 32. By monitoring the number of rotations of the feed rollers 35A, 35B, 35C and 35D after detection of the leading or trailing end of the document by the rear sensor 54 through the number of steps or the like of the encoder or motor 67, it is judged whether or not the leading or trailing end of the document has arrived at a given position upstream in the feed direction of the scanning position or connecting position 38. The image reading of the image reader 22 is controlled according to the detect signal of the rear sensor 54. When the leading end of the document has arrived at the scanning position, the image reading is started. When the trailing end of the document has arrived at the scanning position, the image reading is ended.

The switchback sensor 55 interposed between the connecting position 38 and crossing position 40 of the bidirectional feed path 39 is a sensor which, according to its own on/off state, detects the leading or trailing end of a document being fed along the bidirectional feed path 39. For example, by monitoring the number of rotations of the feed rollers 35A, 35B, 35C and 35D after detection of the leading or trailing end of the document by the switchback sensor 55 through a number of steps of the encoder or motor 67, it is judged whether or not the trailing end of the document has passed through the crossing position 40.

Figure 6:
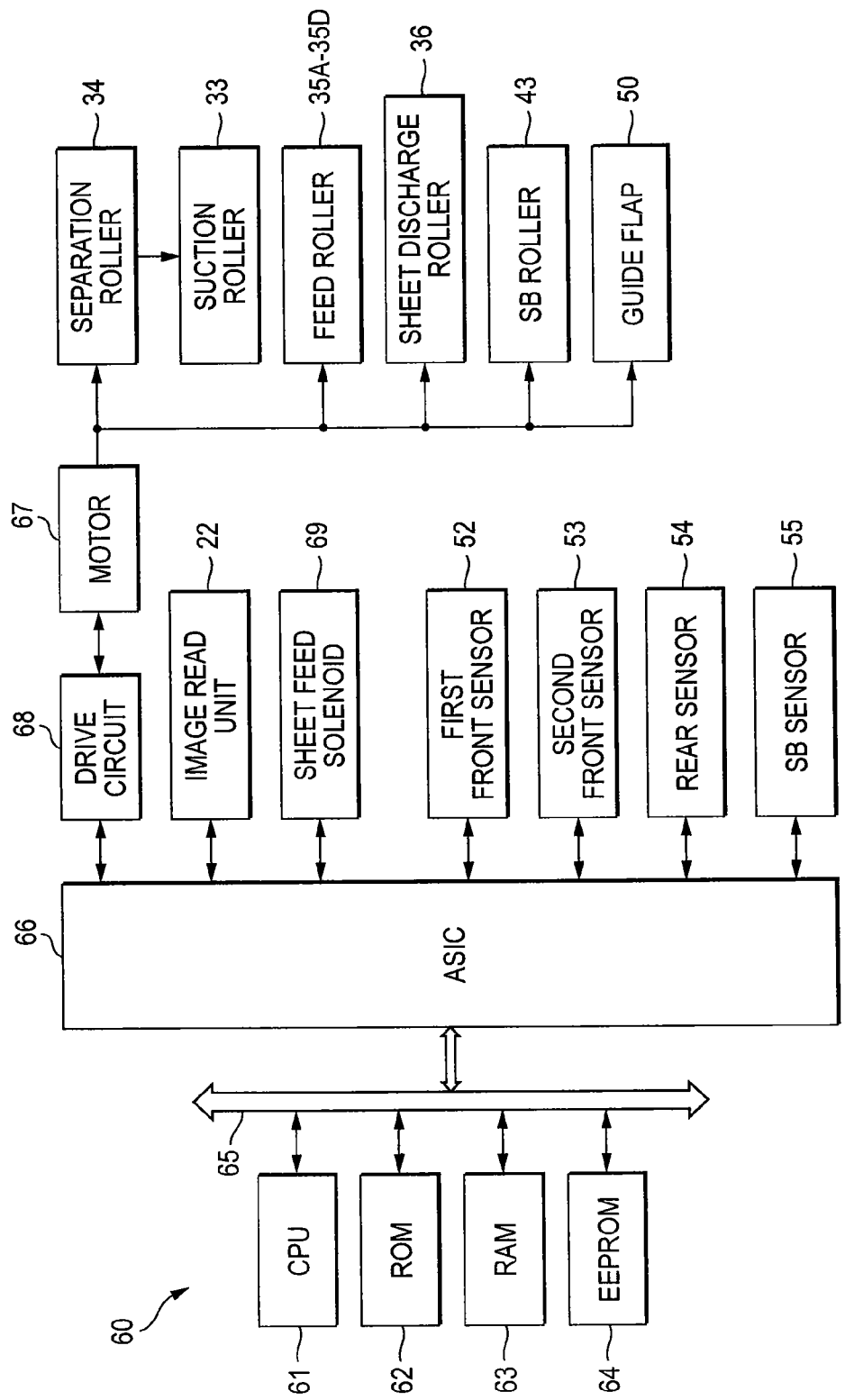
FIG. 6 is a block diagram of the structure of a controller 60.

FIG. 6 shows the structure of the controller 60 of the image read apparatus 1. The controller 60 is a part which controls not only the ADF 3, but also the whole operation of the image read apparatus 1. The controller 60, as shown in FIG. 6, is structured as a microcomputer which is mainly composed of a CPU 61, a ROM 62, a RAM 63, and an electrically erasable and programmable ROM (EEPROM) 64, while the controller 60 is connected through a bus 65 to an application specific integrated circuit (ASIC) 66.

In the ROM 62, programs and the like are stored which are used to control various operations of the image read apparatus 1 and ADF 3. The ROM 63 is used as a storage area or an operation area which temporarily stores therein various kinds of data used when the CPU 61 executes the above programs. The EEPROM 64 is a storage area which stores therein various settings and flags to be continuously stored even after the power supply is turned off. CPU 61, ROM 62, RAM 63 and EEPROM 64 cooperate together in realizing a drive control unit according to the invention.

The ASIC 66, according to an instruction from the CPU 61, generates a phase exciting signal to be electrically applied to the motor 67, applies this phase exciting signal to the drive circuit 68 of the motor 67, and electrically applies a drive signal to the motor 67 through the drive circuit 68, thereby controlling the rotation of the motor 67. The motor 67 is a motor which, through its rotation in both of the forward and backward directions, can apply a drive force to the pick-up roller 33, separation roller 34, feed rollers 35A, 35B, 35C, 35D, sheet discharge roller 36, reversible roller (SB roller) 43 and guide flap 50. The motor 67 serves as the drive source of the ADF 3.

The drive circuit 68 is used to drive the motor 67, and specifically, upon receiving an output from the ASIC 66, the drive circuit 68 generates an electric signal for rotating the motor 67. Upon receiving this electric signal, the motor 67 is rotated in a given rotational direction and the rotational force of the motor 67 is transmitted through the respective drive force transmission mechanisms to the pick-up roller 33, separation roller 34, feed rollers 35A, 35B, 35C, 35D, sheet discharge roller 36, SB roller 43, and guide flap 50, respectively.

An image reader 22 is connected to the ASIC 66 and reads the images of a document being fed from the ADF 3 to the scanning position. Based on a control program stored in the ROM 62, the image reader 22 reads the images of a document. Although not shown, a drive mechanism for reciprocating the image reader 22 is also operated when an output signal from the ASIC 66 is applied thereto.

The first front sensor 52, second front sensor 53, rear sensor 54 and switchback sensor 55 are connected to the ASIC 66. In response to the on/off states of the respective sensors, the CPU 61, based on the control program stored in the ROM 62, allows the ASIC 66 to output a given output signal to thereby operate the motor 67 and image reader 22.

A sheet feed solenoid 69 is connected to the ASIC 66. The sheet feed solenoid 69 is used to transmit and cut off the drive force from the motor 67 to the pick-up roller 33 and separation roller 34. The CPU 61, according to a control program stored in the ROM 62, allows the ASIC 66 to output an output signal at a given timing to thereby operate the sheet feed solenoid 69. The sheet feed solenoid 69 is used to maintain a cutoff state in the transmission of the drive force from the motor 67 to the pick-up roller 33 and separation roller 34.

Specifically, when the sheet feed solenoid 69 is turned on, according to the rotation direction of the motor 67, the drive force transmission can be switched from the cutoff state over to the transmission state.

The respective transmission mechanisms of the drive force from the motor 67 to the pick-up roller 33, separation roller 34, feed rollers 35A, 35B, 35C, 35D, sheet discharge roller 36, SB roller 43, and guide flap 50 may have an arbitrary structure using a gear train, an electromagnetic clutch and the like. As shown in FIG. 1, in a case where the ADF 3 is disposed on the top surface of the document cover 4, the feed path 32 and the respective rollers are stored within a box body of the ADF 3. The motor 67 and drive force transmission mechanisms are also stored within the box body of the ADF 3. The motor 67 and drive force transmission mechanisms are disposed on an end side of the width direction of the feed path 32 of the ADF 3. On end sides of the shafts of the separation roller 34, feed rollers 35A, 35B, 35C, 35D, sheet discharge roller 36, reversible roller 43 and guide flap 50, there are disposed driven gears respectively. When the drive force is transmitted from the motor 67 to the respective driven gears through the respective drive force transmission mechanisms, the respective rollers can be driven.

For example, in the case of a drive force transmission mechanism which transmits the drive force from the motor 67 to the separation roller 34, depending on the forward and backward rotation of the motor 67, the drive force can be transmitted or cut off. This drive force transmission mechanism, depending on the switching of the rotational direction of the motor 67, switches the drive force transmission from the motor 67 to the separation roller 34 from the transmission state over to the cutoff state. This drive force transmission mechanism, after the drive force transmission is switched over to the cutoff state, maintains the cutoff state, regardless of the switching of the rotation direction of the motor 67, until the sheet feed solenoid 69 is turned on. When the sheet feed solenoid 69 is turned on, the drive force transmission mechanism can switch the drive force transmission from the cutoff state over to the transmission state according to the rotation direction of the motor 67. By the thus structured drive force transmission mechanism, the drive force is transmitted from the motor 67 to the separation roller 34, and further, the drive force is transmitted from the separation roller 34 to the pick-up roller 33.

By the way, the drive force is transmitted from the motor 67 to the feed rollers 35A-D, sheet discharge roller 36, reversible roller 43 and guide flap 50, through their associated drive force transmission mechanisms. The respective drive force transmission mechanisms can be composed of a gear train, an electromagnetic clutch and the like. However, the structures of these drive force transmission mechanisms are not related directly to the subject matter of the invention, and thus the detailed description thereof is omitted.

Now, description will be given below of the image reading operation to be executed by the present image read apparatus 1.

The image read apparatus 1 not only can be used as an FBS but also can use the ADF 3. However, detailed description regarding the use of the image read apparatus 1 as an FBS is omitted. When using the ADF 3, it is considered that the document cover 4 is closed with respect to the document placement base member 2. The opening and closing of the document cover 4 can be detected by sensors or the like disposed on the document placement base member 2, and when the document cover 4 is closed, the ADF 3 can be used. A document Gn to be read is placed on the input tray 30 in a face-up manner such that the reading surface (first surface) of the document Gn faces upward. Also, the number of documents Gn may be one sheet or two or more sheets. For example, when reading the images of two or more sheets of documents Gn having the same size, the documents Gn are placed on the input tray 30 in such a manner that the first surface of the first document G1 faces upward, that is, the documents Gn are superimposed on top of one another in a face-up manner.

When a read start instruction is input to the image read apparatus 1, the motor 67 is driven so that the pick-up roller 33, separation roller 34, feed rollers 35A, 35B, 35C, 35D, sheet discharge roller 36 and reversible roller 43 are driven and rotated at their respective given timings. Also, the arm 29 is lowered down to thereby bring the pick-up roller 33 into pressure contact with the document G1 placed on the input tray 30. The documents Gn are separated one by one from the remaining documents and are fed into the feed path 32, starting from the document G1 that is placed at the highest position, and receives directly the rotation forces of the pick-up roller 33 and separation roller 34. The fed document Gn is guided by the feed path 32 and is fed to the scanning position, where the images of the document Gn are read by the image reader 22 located below the scanning position. The document Gn, the images of which have been read, is discharged to the output tray 31. In such an image reading operation, the feed path of the document Gn when the images of one side of the document Gn are read is different from that when the images of both sides of the document Gn are read. Whether the images of one side of the document Gn are read or the images of both sides of the document Gn are read is judged according to a one side reading mode (a one side reading feed mode) or a double-sided reading mode (a double-sided reading feed mode) which have been previously set before the read start instruction is input.

Figure 7:
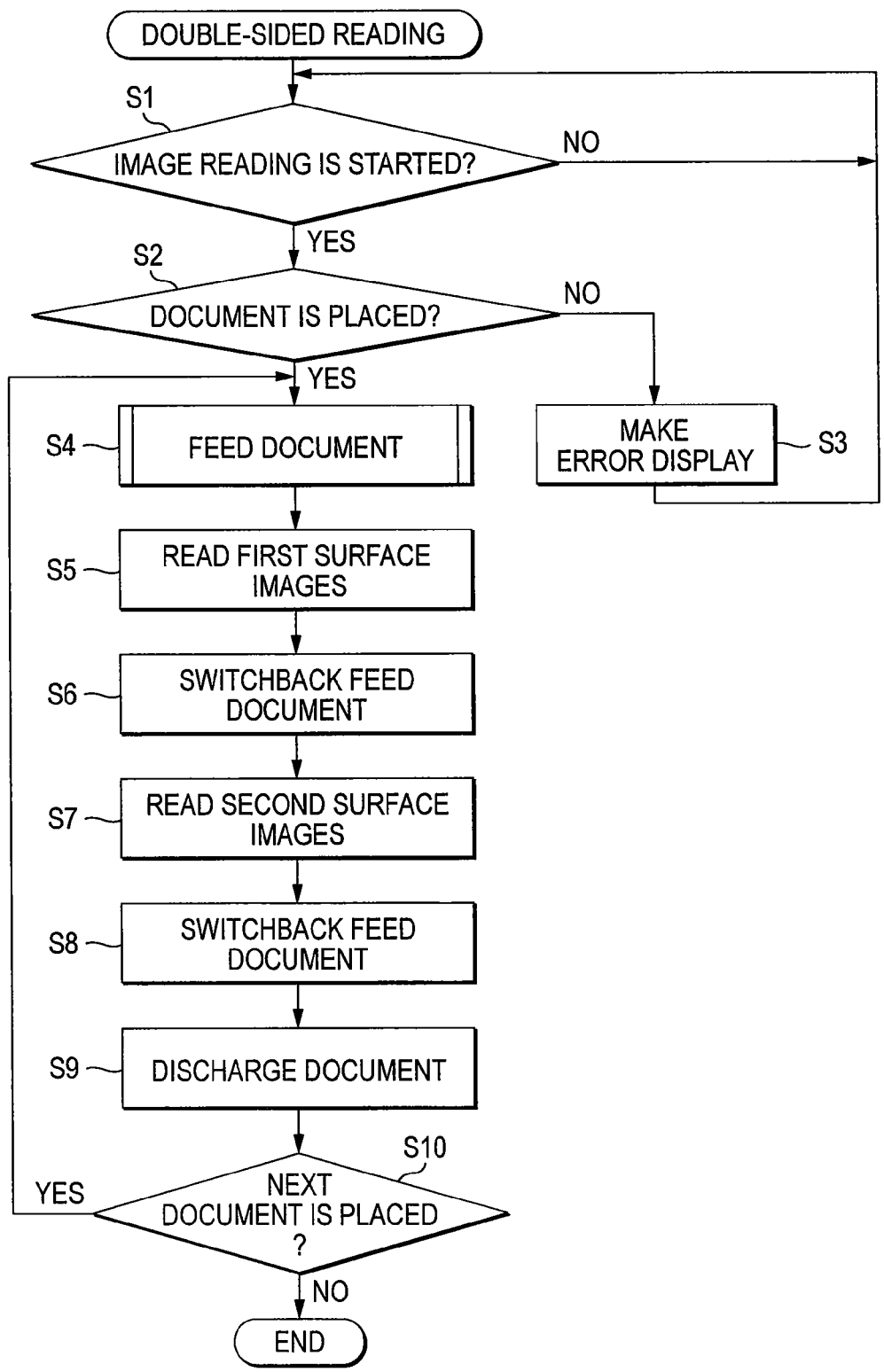
FIG. 7 is a flow chart of the operation of a double-sided image reading mode.
Figure 8:
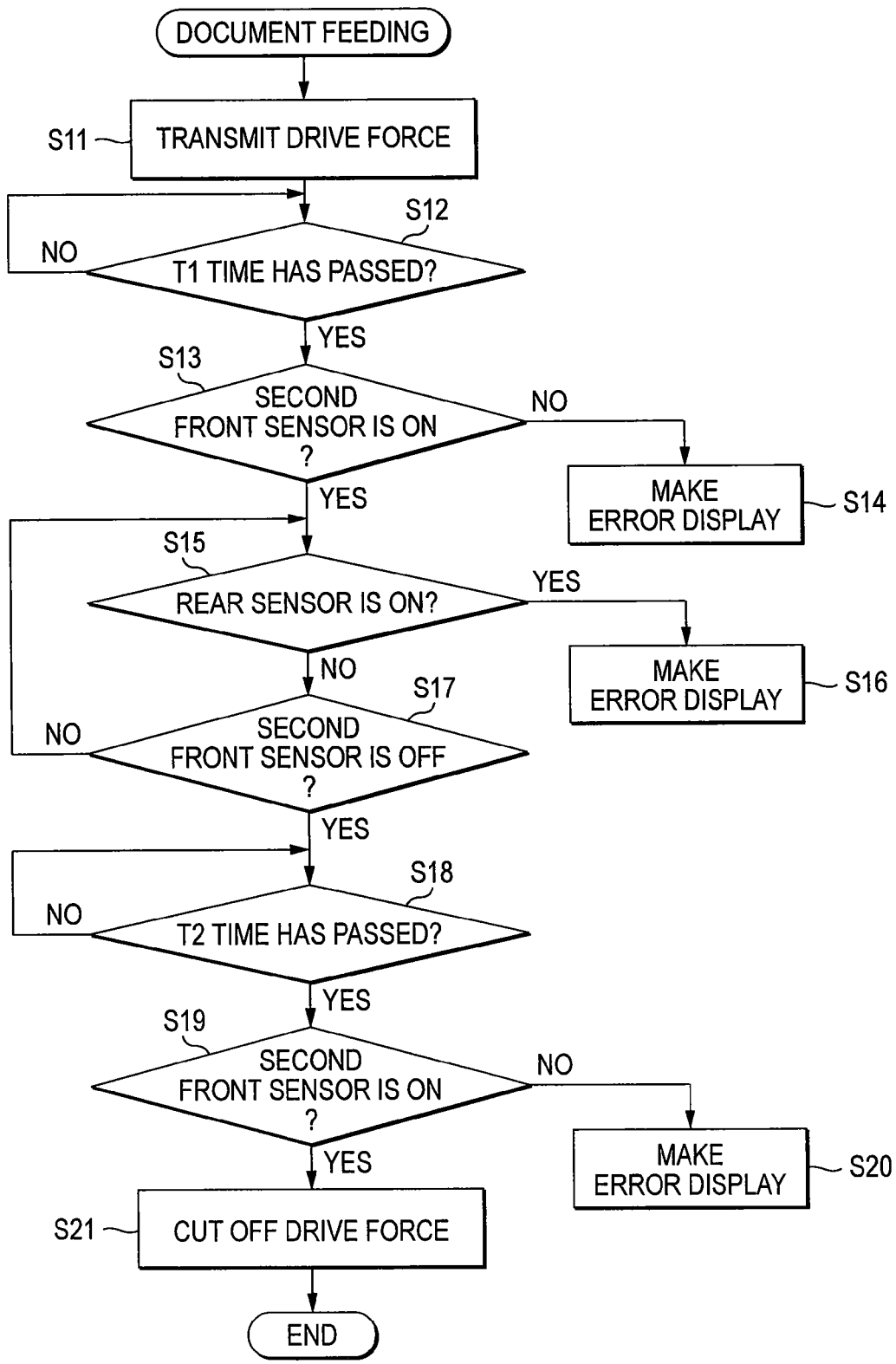
FIG. 8 is a flow chart of the sheet feeding operation of the double-sided image reading mode.

FIG. 7 is a flow chart which shows the operation of the image read apparatus 1 in a double-sided reading mode. Also, FIG. 8 is a flow chart showing a sheet feed operation in the both side reading mode. FIGS. 9 to 16 are respective typical views showing the feed state of a document Gn in the double-sided reading mode. In the figures, the surface of the document Gn shown to have a numeral "1" in the rear of G is a first surface which is read first in the double-sided reading operation, whereas the surface of the document Gn shown to have a numeral "2" is a second surface to be read later. The first and second surfaces are completely opposite to each other.

Figure 9:
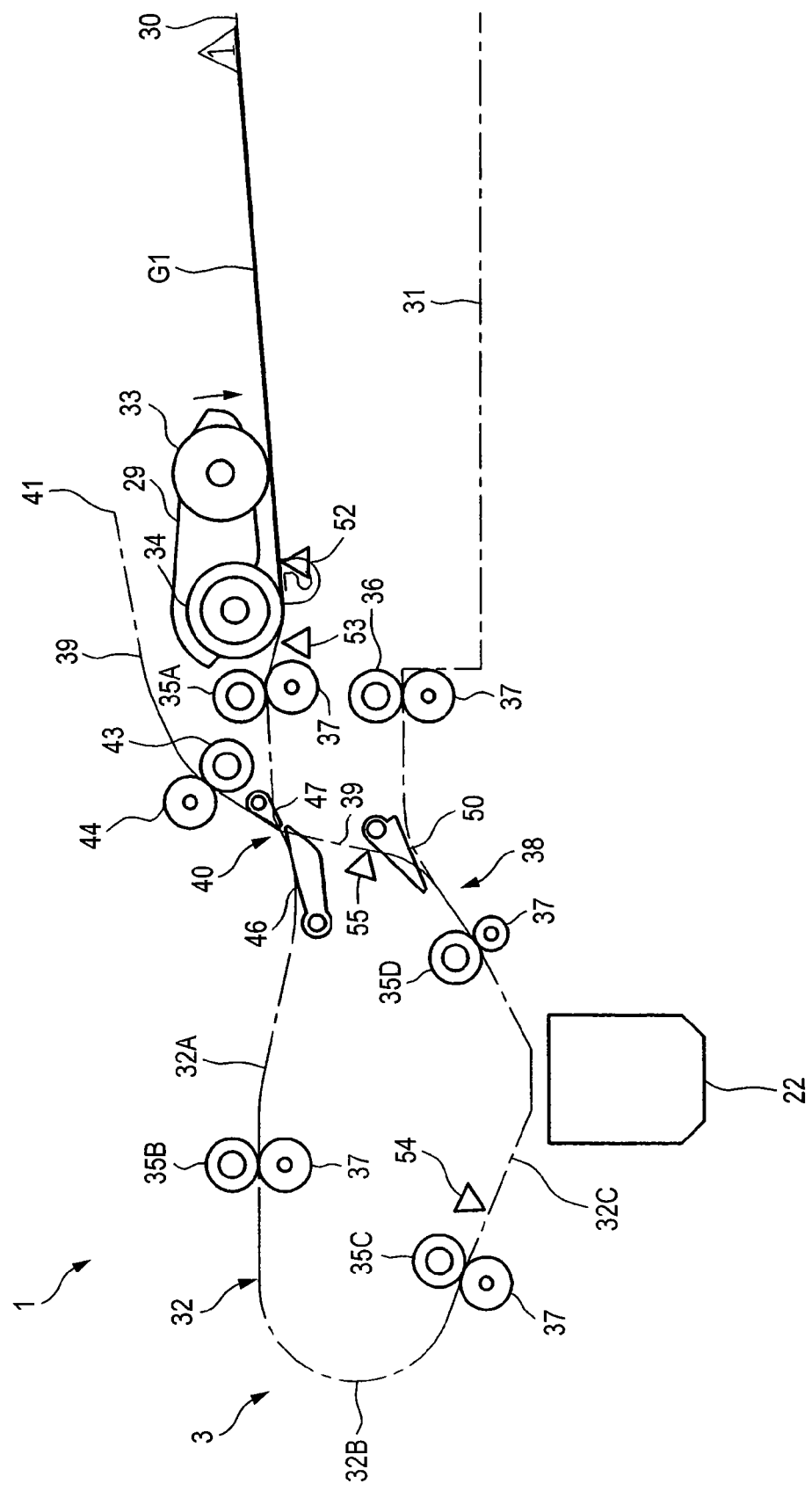
FIG. 9 is a typical view of the image reading operation of the double-sided image reading mode.

Before the document Gn is fed, as shown in FIG. 9, the guide flap 50 is held at a first guide position, that is, at a position which allows the feed path in the connecting position 38 to be continuous from the scanning position side of the feed path 32 to the output tray 31 side. The guide flap 46 is held at a third guide position, that is, at a position which allows the feed path in the crossing position 40 to be continuous from the input tray 30 side of the feed path 32 to the scanning position side. The guide flap 47 is held at a fifth guide position, that is, at a position which the feed path in the crossing position 40 is continuous from the terminal end 41 side of the bidirectional feed path 39 to the scanning position side of the feed path 32.

When a scan start instruction is input to the image read apparatus 1 (S1), it is checked by the first front sensor 52 whether or not the document Gn is placed on the input tray 30 (S2). When it is found that the document Gn is placed at a given position of the input tray 30, it is judged that the first front sensor 52 is on. When the document Gn is not placed on the input tray 30, the first front sensor 52 is off. Depending on the on/off state of the first front sensor 52, the controller 60 checks whether or not the document Gn is placed on the input tray 30. When the controller 60 judges that the document Gn is not placed on the input tray 30 (S2 (N)), the controller 60 controls the liquid crystal display portion 12 of the image read apparatus 1 to display an error message "No document" (S3). When the document Gn is placed on the input tray 30, the controller 60 carries out a sheet feed operation.

In the sheet feed operation, the controller 60 not only drives and rotates the motor 67, but also turns on the sheet feed solenoid 69. According to the rotation of the motor 67, the drive force transmission becomes switchable from the cutoff state to the transmission state. Thus, according to the rotation of the motor 67, the drive force is transmitted from the motor 67 to the separation roller 34 and also to the pick-up roller 33 (S11). When the drive force from the motor 67 is transmitted, the arm 29 is lowered down and the pick-up roller 33 is pressure contacted with a document G1 (first document) that is situated at the highest position on the input tray 30. Also, the pick-up roller 33 and separation roller 34 are respectively rotated in the feed direction, whereby the document G1 is fed into the feed path 32. When two or more documents Gn are placed on the input tray 30, in some cases, with the feeding of the document G1 existing at the highest position, a document G2 (second document) existing just below the document G1 can be fed together with the document G1. However, the feeding of the document G2 is prevented by a separation pad which is disposed at the opposite position of the separation roller 34.

In the feed path 32, a drive force from the motor 67 is transmitted to the feed rollers 35A, 35B, 35C, 35D and sheet discharge roller 36, whereby these respective rollers are rotated so as to feed the document Gn from the upstream side of the feed path 32 to the downstream side thereof, that is, in the feed direction. The document G1 fed from the input tray 30 to the feed path 32 is nipped between the feed roller 35A and pinch roller 37, and thus the rotation force of these rollers is transmitted to the document G1, whereby the document G1 is fed to the crossing position 40 along the feed path 32.

Figure 10:
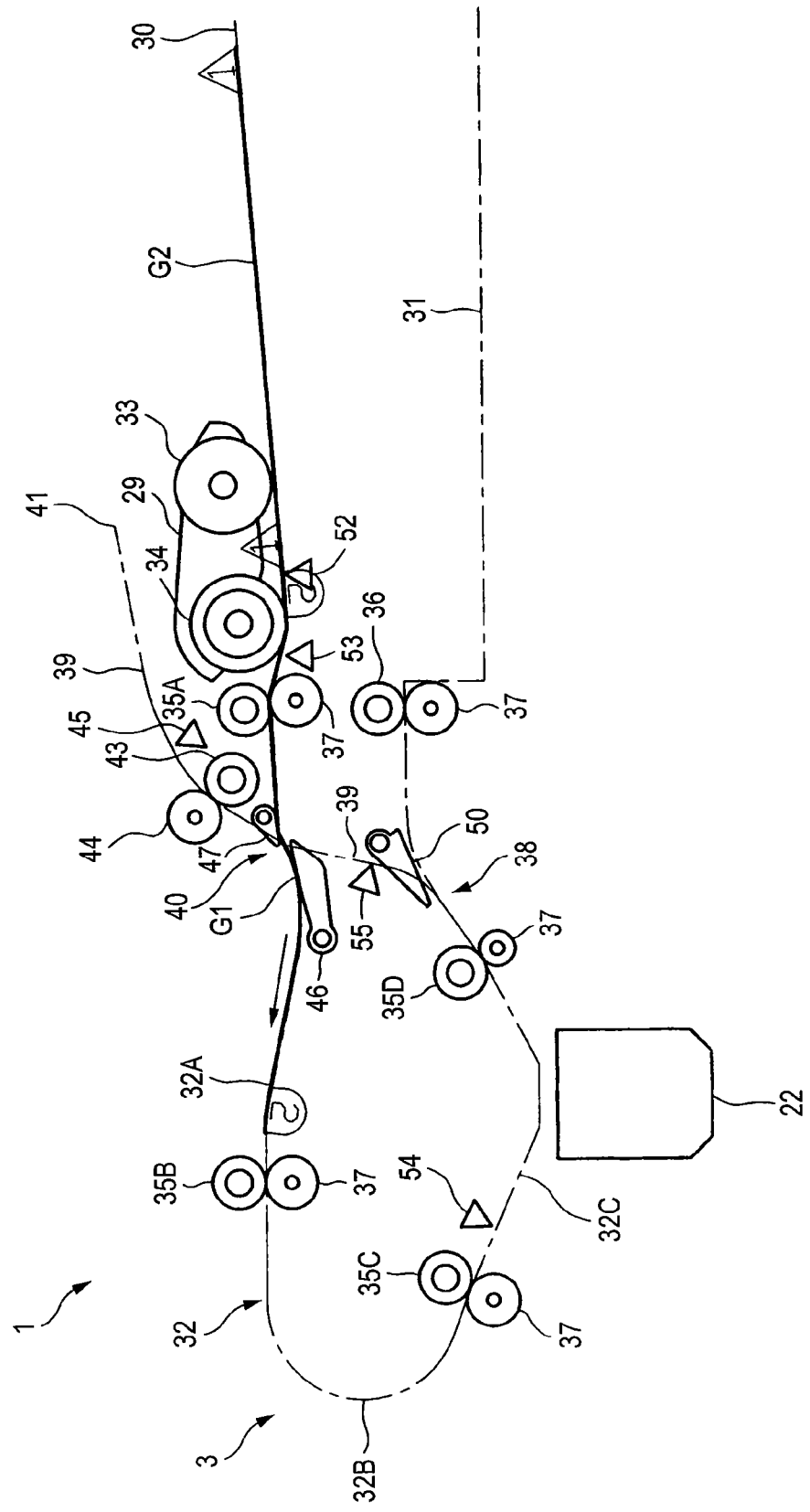
FIG. 10 is another typical view of the image reading operation of the double-sided image reading mode.

As shown in FIG. 10, as the document G1 is fed to the feed path 32, the second front sensor 53 detects the feed-direction leading end of the document G1 and is thereby turned on (S13 (Y)). Even if the pick-up roller 33 and separation roller 34 are respectively rotated in the feed direction, when the document G1 is not fed from the input tray 30 to the feed path 32, the second front sensor 53 is off. Therefore, in a case where, even when a given time T1 has passed after transmission of the drive force to the pick-up roller 33 and separation roller 34 (S12 (Y)), the second front sensor 53 is not turned on (S13 (N)), and the controller 60 controls the liquid crystal display portion 12 to display a sheet feed error (S14).

The guide flap 47 closes the feed path from the input tray 30 side of the document feed path 30 to the crossing position 40, and therefore, the feed-direction leading end of the document G1 being fed to the crossing position 40 is contacted with the guide flap 47. As shown in FIG. 10, the guide flap 47 is pivoted in such a manner that it is pushed aside by the document G1 being fed along the feed path 32, whereby the position of the guide flap 47 is changed from the fifth guide position to the sixth guide position. As a result, the feed from the input tray 30 side of the feed path 32 to the scanning position side is continuous, and at the same time, the feed path to the terminal end 41 side of the bidirectional feed path 39 is closed. Also, the feed path to the connecting position 38 of the bidirectional feed path 39 is kept closed by the guide flap 46. Therefore, the document G1, which has arrived at the crossing position 40 from the input tray 30 side of the feed path 32, is guided by the guide flaps 46 and 47 and is fed to the scanning position side of the feed path 32 without advancing in either direction of the bidirectional feed path 39.

The peripheral velocities of the respective feed rollers 35A, 35B, 35C, 35D and sheet discharge roller 36 are set to be faster than the peripheral velocity of the separation roller 34. Also, in the separation roller 34, there is provided a round clutch. Thus, the separation roller 34 can be rotated idly around in a non-engaged state. The separation roller 34 is combination rotated at a faster velocity than the originally transmitted peripheral velocity due to the document G1 which is being fed in pressure contact with the separation roller 34 and nipped by the feed roller 35A and pinch roller 37. When the document G1 is separated from the separation roller 34, the drive shaft of the separation roller 34 rotates idly at a rate corresponding to the velocity that has accelerated due to the combination rotation, thereby causing the separation roller 34 to stop temporarily. Therefore, a document G2 to be fed next is not fed to the feed path 32 while the separation roller 34 is temporarily stopped. On the other hand, the document G1 is fed along the feed path 32 by the respective feed rollers 35A~D. As a result of this, as shown in FIG. 11, there is formed a given clearance (sheet space) in the feed direction between the first and second documents G1 and G2.

Figure 11:
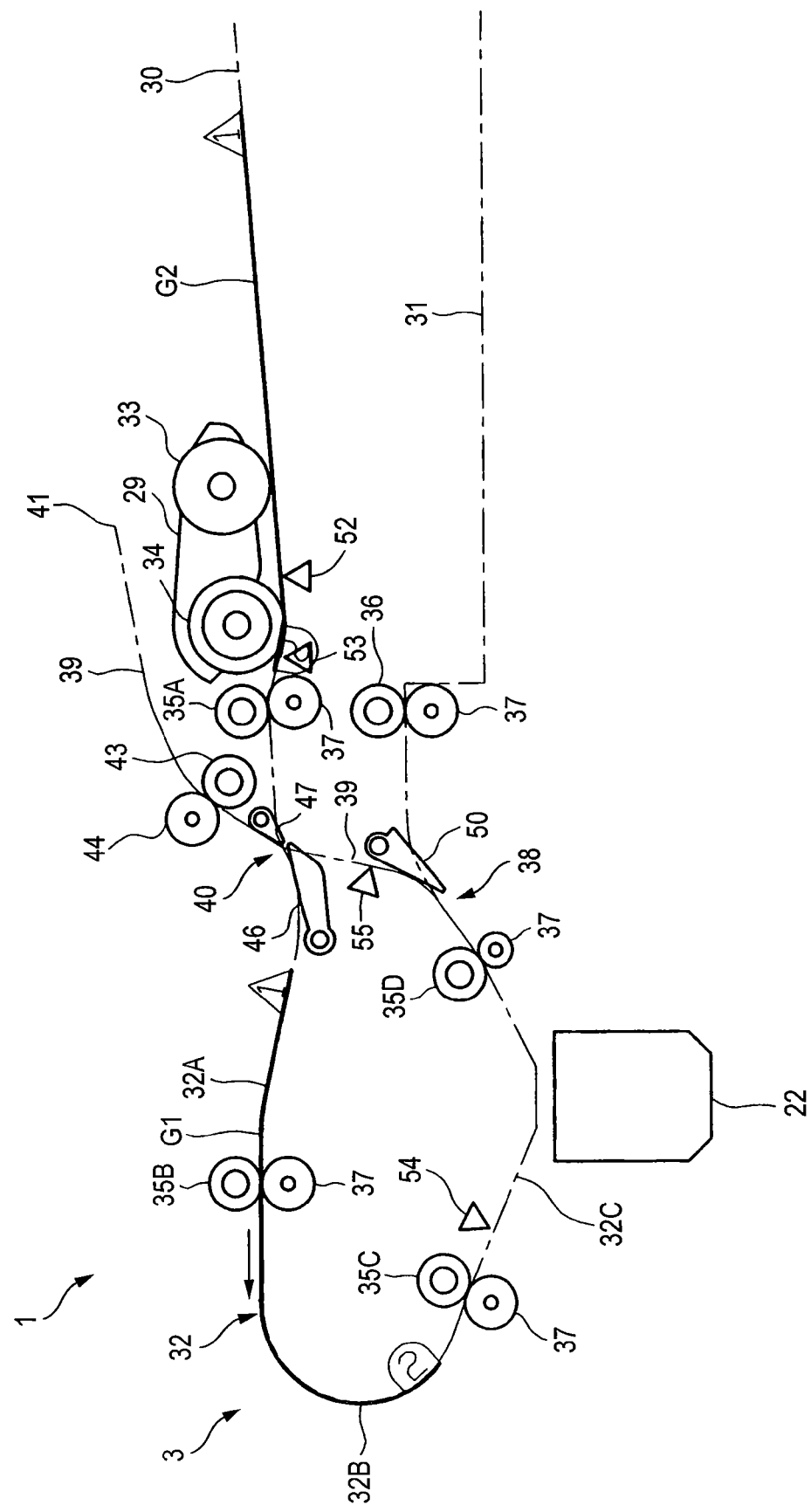
FIG. 11 is another typical view of the image reading operation of the double-sided image reading mode.

As shown in FIG. 11, when the document G1 is fed completely to the feed path 32, the second front sensor 53 detects the feed-direction trailing end of the document G1 and is thereby turned off (S17). As described above, the feed distance of the feed path 32 from the second front sensor 53 to the rear sensor 54 is longer than the longitudinally feeding A4 size, that is, the maximum size that allows double-sided reading. According to the present aspect, in addition to this, there is formed a given sheet space between the documents G1 and G2, the feed distance from the second front sensor 53 to the rear sensor 54 being longer than a length obtained by adding the sheet space to 297 mm. Therefore, there is no possibility that, before the second front sensor 53 detects the feed-direction trailing end of the document G1 and is thereby turned off, the rear sensor 54 can detect the feed-direction leading end of the document G1 and can be thereby turned on. Supposing that the rear sensor 54 turns on before the second front sensor 53 turns off (S15 (Y)), the controller 60 is able to judge that the size of the document G1 is larger than the double-sided readable maximum size. In this case, the controller 60 controls the liquid crystal display portion 12 to error display an error massage to the effect that the size of the document is larger than the readable maximum size (S16).

After the document G1 is completely fed to the feed path 32, when the drive shaft is rotated idly and the temporary stop of the separation roller 34 is thereby ended, the separation roller 34 is rotated again in the feed direction. With the rotation of the separation roller 34, the pick-up roller 33 is also rotated in the feed direction. As a result of this, the next document G2 is fed from the input tray 30 into the feed path 32. The second front sensor 53 detects the feed-direction leading end of the document G2 and is thereby turned on (S19 (Y)). Supposing that the pick-up roller 33 and separation roller 34 are rotated in the feed direction, when the document G2 is not fed from the input tray 30 to the feed path 32, the second front sensor 53 is off. Therefore, in a case where, even if a given time T2 has passed after the second front sensor 53 detects the feed-direction trailing end of the document G1 and is thereby turned off (S18 (Y)), the second front sensor 53 does not turn on (S13 (N)), and the controller 60 controls the liquid crystal display portion 12 to display a sheet feed error display (S20).

When the second front sensor 53 detects the feed-direction leading end of the document G2 and is thereby turned on (S19

(Y)), the controller 60 cuts off the drive force transmission from the motor 67 to the separation roller 34 (S21). Thus, the pick-up roller 33 and separation roller 34 are caused to stop, and the feed-direction leading end of the document G2 is pressure contacted with the separation roller 34 and is thereby held by and between the separation roller 34 and separation pad. The controller 60, even after the drive force transmission from the motor 37 to the separation roller 34 is cut off, does not cut off the drive force transmission to the respective feed rollers 35A~D but allows them to rotate in the feed direction. Since the feed-direction leading end of the document G2 has not arrived at the nip position between the feed roller 35A and pinch roller 37, the rotation of the feed roller 35A is not yet applied to the leading end of the document G2 to thereby prevent the document G2 from being fed due to such rotation. Thus, the document G2 stands still in a state where it is pressed against the separation roller 34. Also, the document G1 is fed further along the feed path 32 by the feed rollers 35A~D.

Cutoff of the drive force transmission from the motor 67 to the separation roller 34, as described above, is carried out, for example, by switching the rotation of the motor 67. To switch the rotation of the motor 67, the controller 60, for example, outputs a stop instruction or a reversal instruction to the motor 67 which is rotating in the forward direction. On receiving such instruction, the motor 67 stops its rotation, and then rotates in the reversed direction. Such rotation switching of the motor 67 is carried out before the leading end of the document G1 arrives at the detect position of the rear sensor 54. Therefore, the leading end of the document G1 has not arrived at the scanning position and the image reader 22 has not started the image reading of the first surface of the document G1. While the image reading of the first surface of the document G1 is under execution, the rotation switching of the motor 67 is carried out, and the rotation speeds of the feed rollers 35A~D are caused to vary due to the stopping operation of the motor 67 in the rotation switching operation or the like. Therefore, the feed speed of the document G1 being fed at the scanning position is also varied, thereby raising a fear that the image to be read can be deteriorated in quality, for example, the image can be distorted. As in the present aspect, when the rotation switching of the motor 67 is executed before the arrival of the feed-direction leading end of the document G1 at the scanning position to thereby cut off the drive force transmission to the separation roller 34, the deterioration of the reading image of the document G1 can be prevented.

In this manner, the controller 60, when the rear sensor 54 is off, judges that the feed-direction leading end of the document G1 has not arrived at the scanning position, whereas, when the second front sensor 53 is on, it judges that the document G2 has been pressure contacted with the separation roller 34. The drive force transmission to the pick-up roller 33 and separation roller 34 is cut off, not only before the feed-direction leading end of the document G1 has arrived at the scanning position, but also before the document G2 is pressure contacted with the separation roller 34 and is fed by the feed roller 35A and its associated pinch roller 37.

Figure 12:
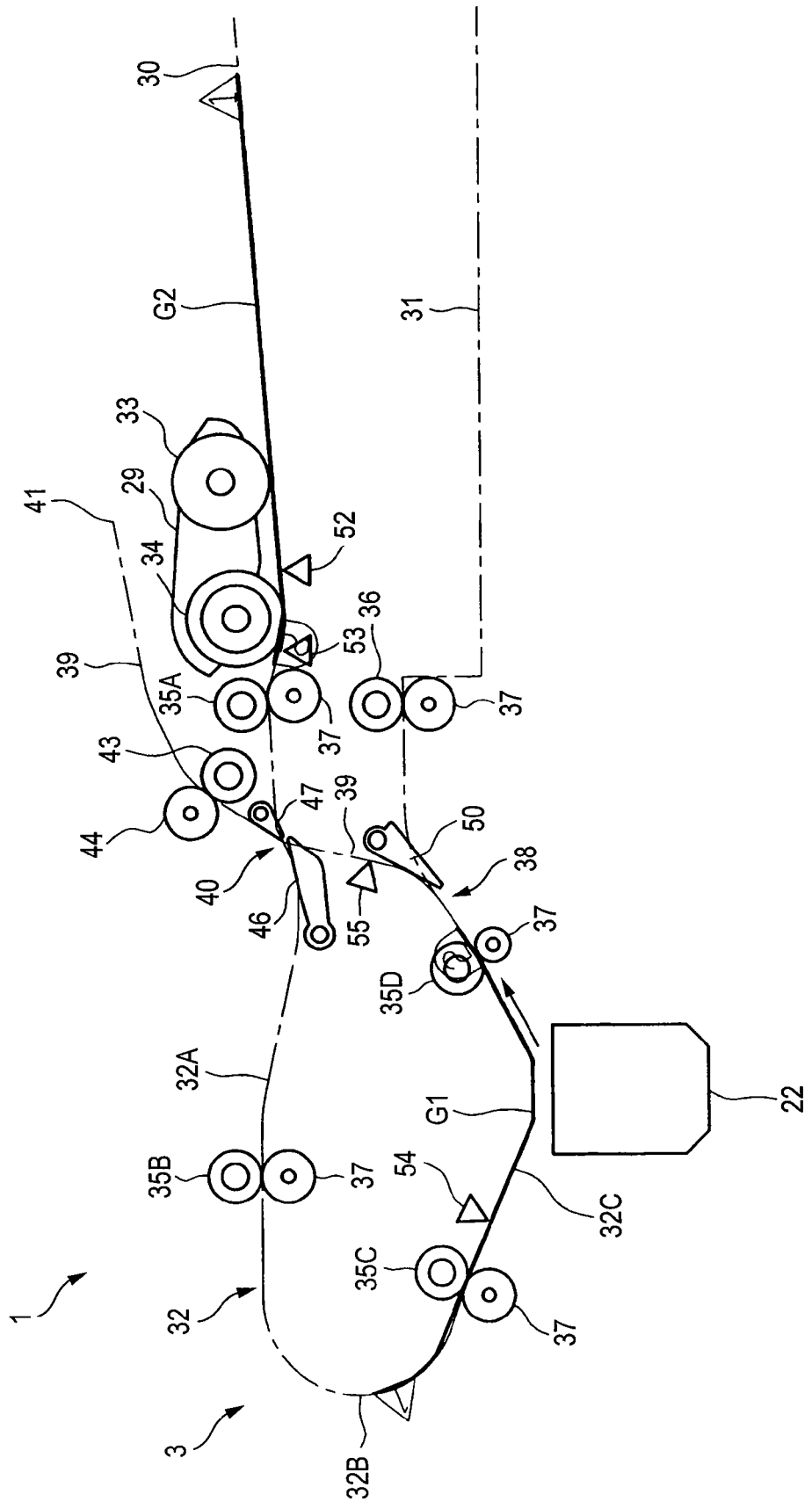
FIG. 12 is another typical view of the image reading operation of the double-sided image reading mode.

As shown in FIG. 12, the document G1 is fed in such a manner that it reverses downward along the curved portion 32B of the feed path 32, while the rear sensor 54 detects the feed-direction leading end of the document G1 and is thereby turned on. Since the feed-direction leading end of the document G1 arrives at the scanning position after passage of a given time since it was detected by the rear sensor 54, the controller 60, when the rear sensor 54 is turned on and after passage of a given time, allows the image reader 22 to apply a timing signal for start of reading to the image reader 22 to operate the image reader 22, thereby reading the images of the document G1 (S5). The document G1 passes through the scanning position with its first surface facing the image reader 22, so that the images of the first surface of the document G1 are read by the image reader 22. The rear sensor 54 turns off when it detects the feed-direction trailing end of the document G1. When the rear sensor 54 turns on, the controller 60, after passage of a given time, applies a timing signal for end of reading to the image reader 22, to thereby end the image reading of the first side of the document G1. Data on the images of the first side of the document G1 read by the image reader 22 are stored in a given area of the RAM 63.

Figure 13:
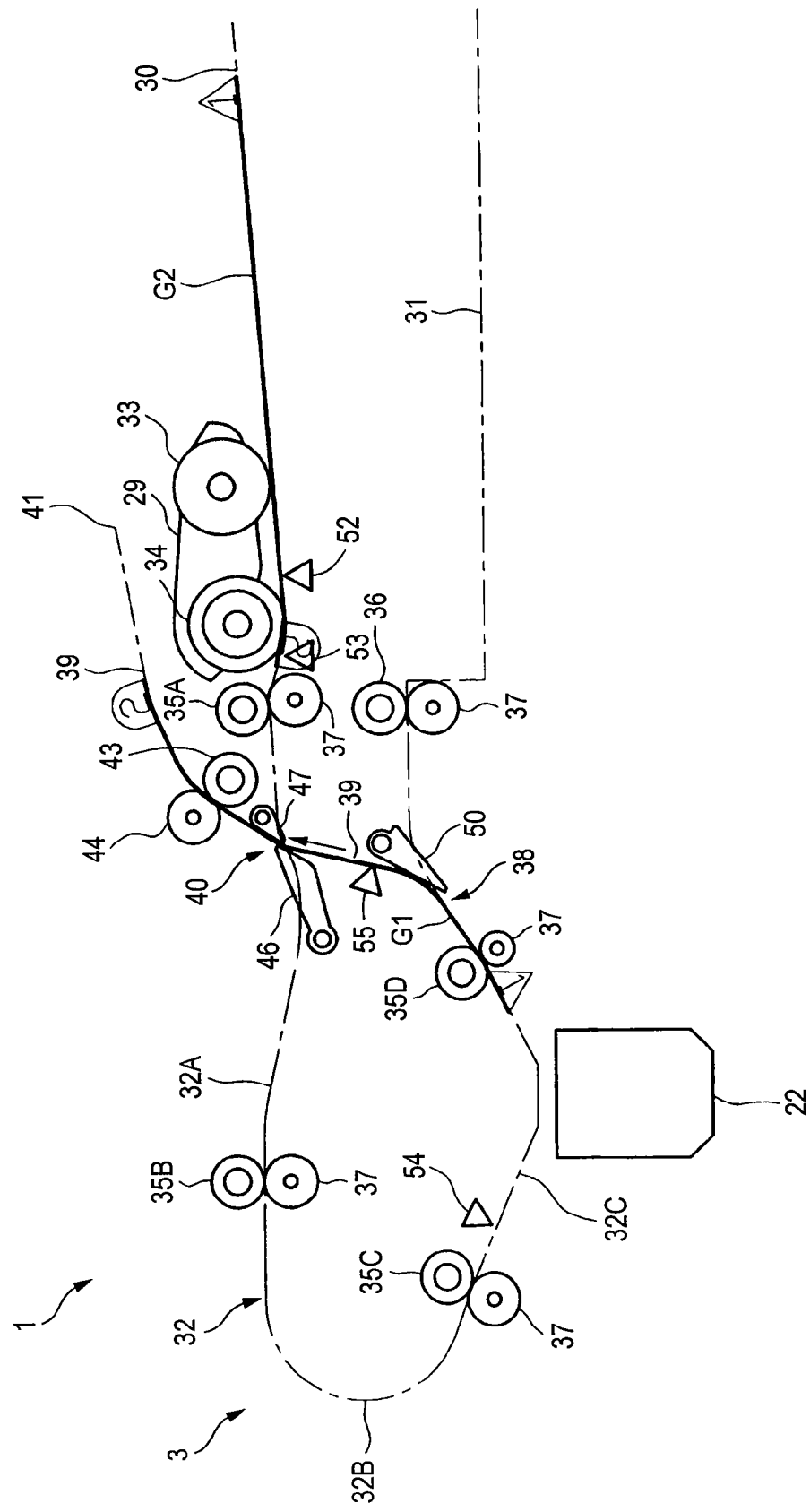
FIG. 13 is another typical view of the image reading operation of the double-sided image reading mode.

As shown in FIG. 13, the feed-direction leading end of the document G1, the first surface of which has been read, is guided by the guide flap 50 to advance along the connecting position 38 from feed path 32 to the bidirectional feed path 39, whereby it is switchback-fed (S6). The guide flap 50, for example, according to the rotation switching of the motor 67, is varied in position from the first guide position to the second guide position. The switchback sensor 55 detects the feed-direction leading end of the document G1 which has entered the bidirectional feed path 39, and is thereby turned on. The reversible roller 43, to which a drive force has been transmitted from the motor 67, is rotating in the pull-in direction.

Since the guide flap 46 closes the feed path from the bidirectional feed path 39 to the crossing position 40, the feed-direction leading end of the document G1 having entered the bidirectional feed path 39 is contacted with the guide flap 46 when it arrives at the crossing position 40. The guide flap 46, as shown in FIG. 13, is rotated in such a manner that it pushes up the switchback flap 39 onto the feed-direction leading end of the document G1 to be fed, so that the guide flap 46 changes its position from the third guide position to the fourth guide position. As a result, the feed path from the connecting position 38 side of the bidirectional feed path 39 to the terminal end 41 side of the bidirectional feed path 39 is allowed to be continuous, and at the same time, the feed path to the scanning position side of the feed path 32 is closed. Also, the feed path to the input tray 30 side of the feed path 32 is closed by the guide flap 47. Therefore, the feed-direction leading end of the document G1, which has arrived at the crossing position 40 from the connecting position 38 side of the bidirectional feed path 39, is guided by the guide flaps 46 and 47 and is fed to the bidirectional feed path 39 without advancing to the feed path 32. The feed-direction leading end of the document G1 is nipped between the reversible roller 43 and its associated pinch roller 44, and is fed to the terminal end 41 side of the bidirectional feed path 39 due to the pull-in-direction rotation of the reversible roller 43.

Figure 14:
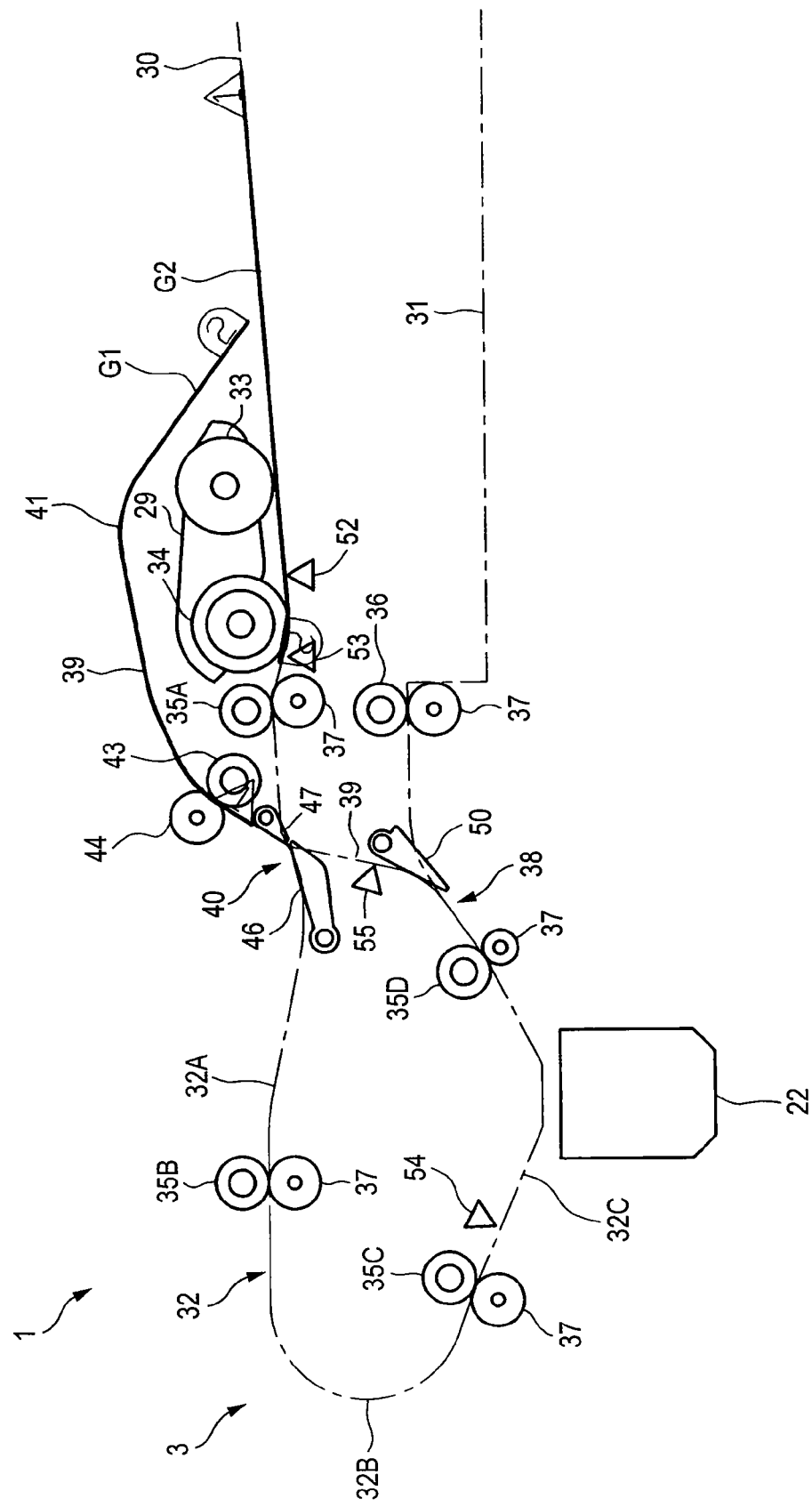
FIG. 14 is another typical view of the image reading operation of the double-sided image reading mode.

As shown in FIG. 14, after the feed-direction trailing end of the document G1 has completely entered the terminal end 41 side beyond the crossing position 40 of the bidirectional feed path 39, the controller 60 switches the rotation of the motor 67. The switchback sensor 55 detects the feed-direction trailing end of the document G1 being fed along the bidirectional feed path 39 and is thereby turned off. After passage of a given time, the feed-direction trailing end of the document G1 passes through the crossing position 40. Therefore, the controller 60 judges, from the detect signal of the switchback sensor 55 as well as from the counted feed distance or feed time by the feed roller 35D and reversible roller 43, that the feed-direction trailing end of the document G1 has completely entered the terminal end 41 side beyond the crossing position 40 of the bidirectional feed path 39. Since the document G1 passes through the crossing position 40 and parts away from the guide flap 46, the guide flap 46 is rotated downward to return to the third guide position.

The feed-direction leading end of the document G1, the feed-direction trailing end of which has completely entered the terminal end 41 side from the crossing position of the bidirectional feed path 39, is projected from the terminal end 41 to the outside of the ADF 3 toward the input tray 30. As shown in FIG. 1, since the top cover 6 of the ADF 3 includes the document support portion 42, part of the document G1 is supported by the document support portion 42. However, as the size of the document 1 increases, the portion of the document 1 that projects from the terminal end 41 also increases. Therefore, for example, when the document G1 has an A4 size of a longitudinal feeding type which is the maximum size that can be read for both sides, or when the feed distance from the crossing position 40 of the bidirectional feed path 39 to the terminal end 41 is relatively short, there is a fear that the feed-direction leading end of the document G1 can be contacted with the document G2 existing on the input tray 30. Since the feed-direction leading end side of the document G2 on the input tray 30 is pressure contacted with the separation roller 34 and is held between the separation roller 34 and its associated separation pad, even when the document G1 projecting from the terminal end 41 is contacted therewith, the document G2 cannot be moved in the feed direction. Also, in the case where a document abuts on the lower side of the document G2, since the document G1 will not be contacted therewith, unless the document G2 moves, the document maintains its stationary state. This makes it possible to maintain the placement state of two or more documents including the document G2 placed on the input tray 30. As the controller 60 switches the rotation direction of the motor 67, the document G1, which is projected from the terminal end 41 while it is nipped by the reversible roller 43 and pinch roller 44, is returned to the crossing position 40. Even when the rotation direction of the motor 67 is switched, a drive force in the feed direction is transmitted to the respective feed rollers 35A~D and sheet discharge roller 36, whereby these rollers are rotated in the feed direction.

Figure 15:
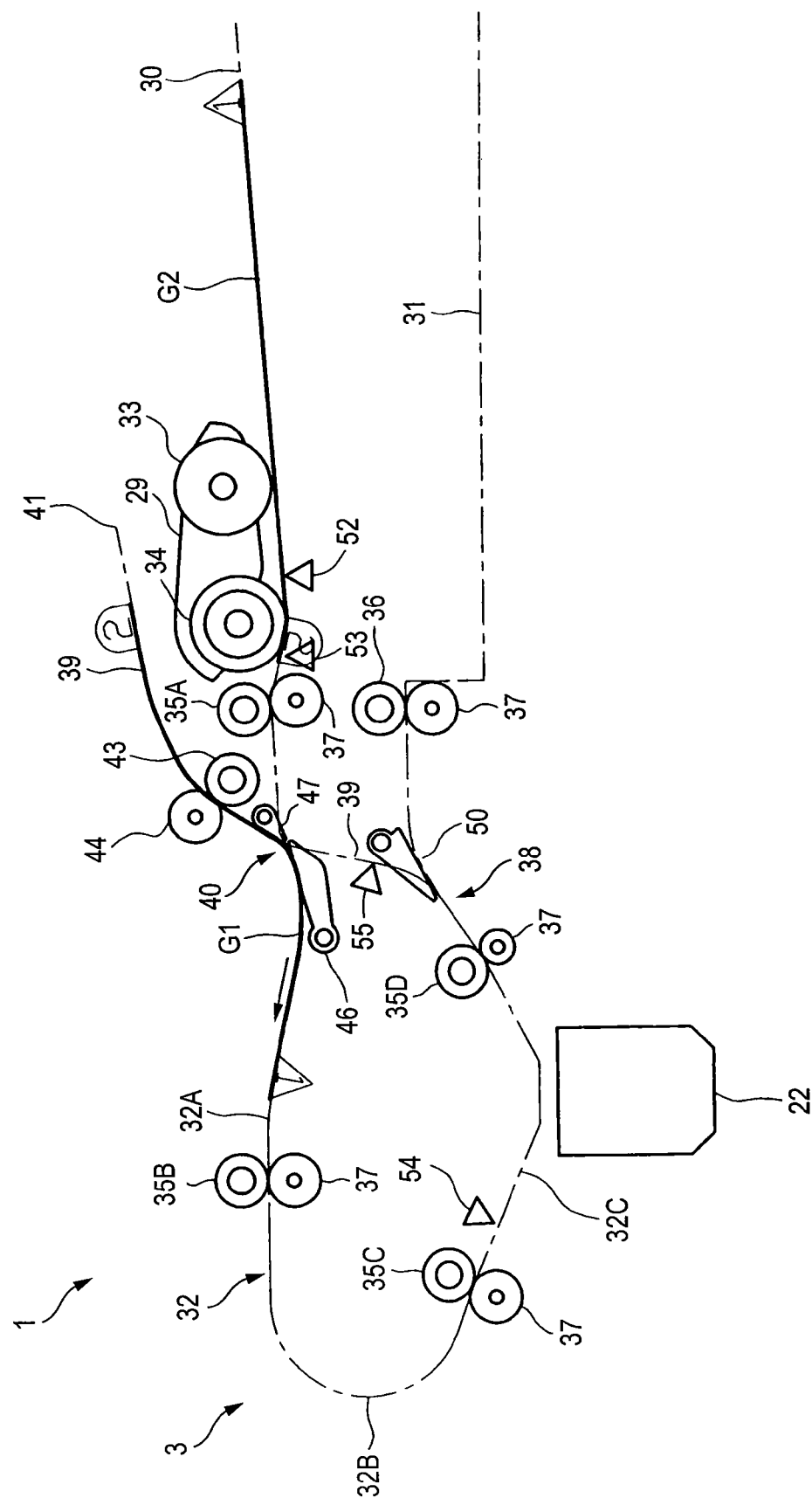
FIG. 15 is another typical view of the image reading operation of the double-sided image reading mode.

As shown in FIG. 15, the document G1, which has been returned from the bidirectional feed path 39, is contacted in the crossing position 40 with the guide flap 46 held at the third guide position. The guide flap 46 is prevented from pivoting downward from the third guide position. Therefore, the feed path from the terminal end 41 side of the bidirectional feed path 39 to the scanning position side of the feed path 32 is allowed to be continuous, and at the same time, the feed path to the connecting position 38 side of the bidirectional feed path 39 is closed. Also, the guide flap 47 closes the feed path to the input tray 30 side of the feed path 32. Thus, the document G1 is guided by the guide flaps 46 and 47 and is fed from the terminal end 41 side of the bidirectional feed path 39 to the scanning position side of the feed path 32 without entering the connecting position 38 side of the bidirectional feed path 39 or the input tray 30 side of the feed path 32. The document G1 is returned to the upstream side of the scanning position of the feed path 32 from the bidirectional feed path 39, whereby the document G1 is fed again along the feed path 32 with the leading and trailing ends thereof reversed when compared with the state where the document G1 was initially fed along the feed path 32. In this manner, the document G1 is switchback-fed. The document G1 is fed along the feed path 32 with its second side facing the scanning position.

Figure 16:
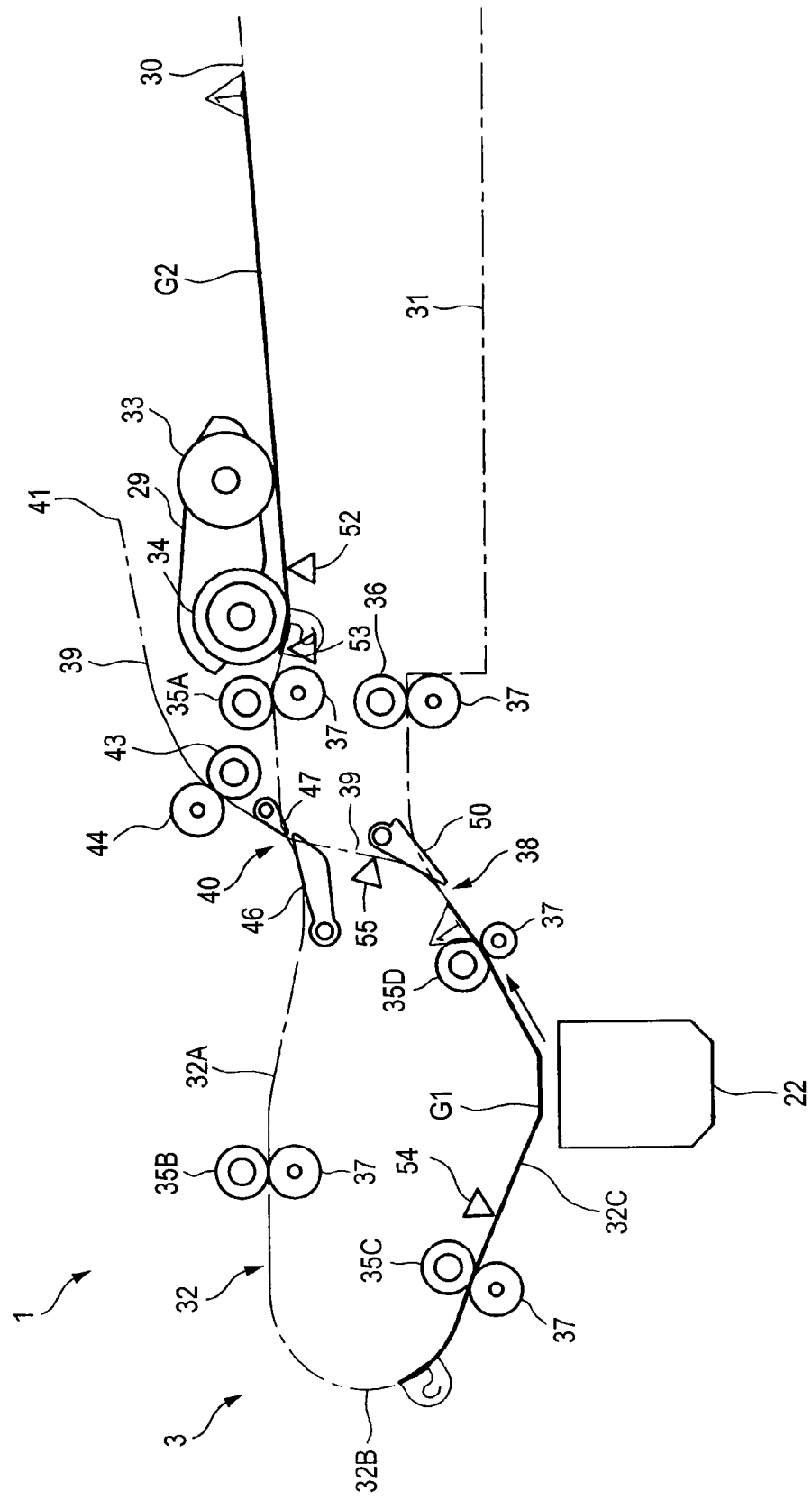
FIG. 16 is another typical view of the image reading operation of the double-sided image reading mode.
Figure 17:
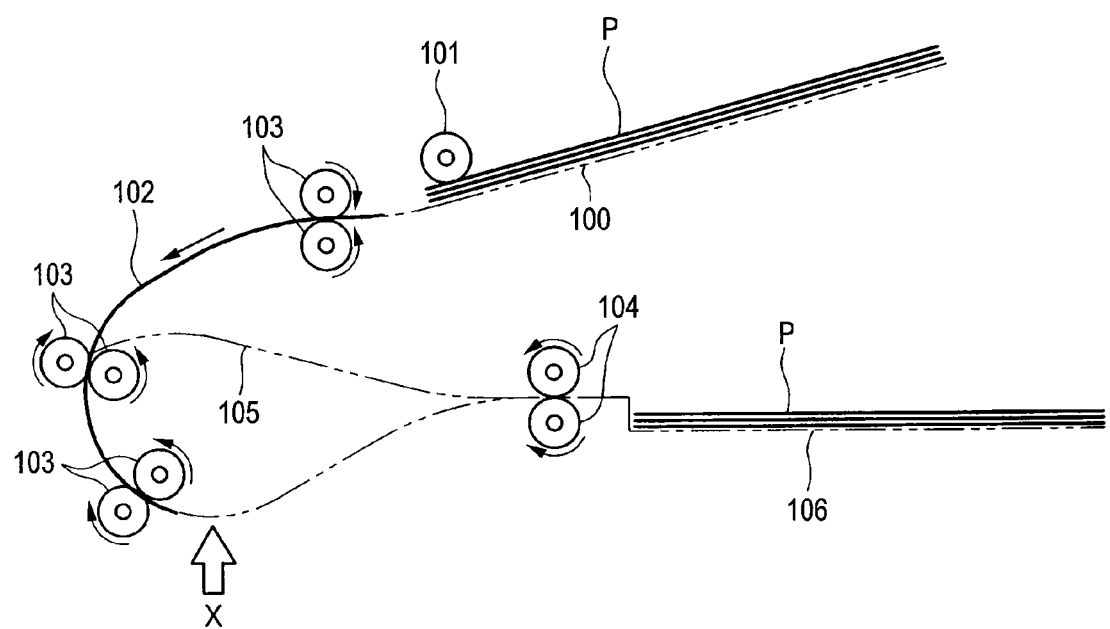
FIG. 17 is a typical view of a document feeding operation for reading the images of both sides of a document according to a conventional document feeder.
Figure 18:
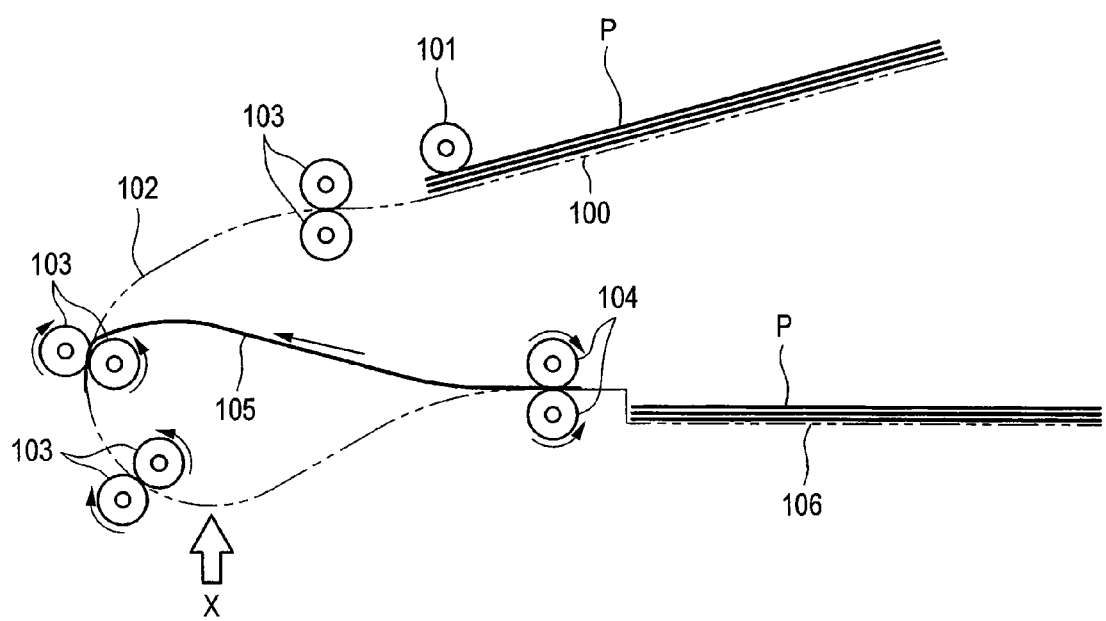
FIG. 18 is a typical view of a document feeding operation for reading the images of both sides of a document according to a conventional document feeder.

When the feed-direction leading end of the document G1 is detected by the rear sensor 54 and the present feed-direction leading end arrives at the scanning position, as shown in FIG. 16, the controller 60 allows the image reader 22 to scan the images of the second side of the document G1 (S7). After the second side thereof has been scanned, the feed-direction leading end of the document G1 is guided by the guide flap 50 and advances in the connecting position 38 from the feed path 32 to the bidirectional feed path 39. When the feed-direction trailing end of the document G1 is detected by the rear sensor 54 and the present trailing end arrives at the scanning position, the controller 60 ends the image reading of the second side of the document G1 by the image reader 22. Data on the images of the second side of the document G1 scanned by the image reader 22 are stored in a given area of the RAM 63.

The feed-direction leading end of the document G1 having arrived at the crossing position 40, similarly to FIG. 13, pushes up the guide flap 46 to change the guide flap 46 from the third guide position to the fourth guide position and advances in the crossing position 40 to the terminal end 41 side of the bidirectional feed path 39. Similarly to FIG. 14, after the feed-direction trailing end of the document G1 has completely entered the terminal end 41 side beyond the crossing position 40 of the bidirectional feed path 39, the controller 60 switches the rotation direction of the motor 67 and rotates the reversible roller 43 in the return direction to thereby return the document G1 to the crossing position 40. Similarly to FIG. 15, the document G1 having returned from the bidirectional feed path 39 is guided by the guide flaps 46 and 47 and is fed from the terminal end 41 side of the bidirectional feed path 39 to the scanning position of the feed path 32. Therefore, the document G1 is fed again to the feed path 32 while the leading and trailing ends thereof are reversed again, that is, in the state where the document G1 was initially fed to the feed path 32 (S8). In this switchback feeding operation, in some cases, there is a possibility that the feed-direction leading end of the document G1 can be contacted with the document G2 existing on the input tray 30. As described above, since the feed-direction leading end side of the document G2 on the input tray 30 is in pressure contact with the separation roller 34 and its associated friction pad arranged at the opposite direction of the separation roller 34, the placement state of the document Gn can be maintained on the input tray 30.

The document G1, which is switchback fed again, passes through the scanning position with its first side facing the scanning position, is guided in the connecting position 38 to the output tray 31 side by the guide flap 50, and is then discharged with its first side facing downward to the output tray 31 by the sheet discharge roller 36 (S9). Since the next document G2 is placed on the input tray 30 (S20 (Y)), the first front sensor 52 is on. The controller 60 turns on the sheet feed solenoid 69 to thereby provide a state in which the drive force transmission from the motor 67 to the separation roller 34 can be switched from the cutoff state over to the transmission state according to the rotation of the motor 67, and transmits the drive force (S11), thereby rotating the pick-up roller 33 and separation roller 34 in the feed direction. As described above, since the document G2 is pressure contacted with the separation roller 34 by the separation roller 34 and is thereby made to stand still at a given position on the input tray 30 regardless of its contact with the document G1, as the pick-up roller 33 and separation roller 34 are rotated, the document G2 can be fed positively to the feed path 32. Therefore, there is no possibility that a sheet feed error can happen due to the shifted position of the document G2. With the document G2 fed to the feed path 32, there is executed a double-sided image reading operation similar to the above-mentioned case.

In the present aspect, description has been given of the double-sided image reading operation by the image read apparatus 1, assuming that each document is discharged to the output tray 31 in a state where the order of two or more documents Gn placed on the input tray 30 is maintained. However, when it is not necessary to match the order of the documents Gn placed on the input tray 30 to the order of the documents Gn discharged to the output tray 31, after the documents Gn are fed with their respective second sides facing the scanning position, without moving the documents Gn back to the bidirectional feed path 39 again, the documents Gn may be fed along the connecting position 38 to the output tray 31 side to thereby discharge the documents Gn to the output tray 31. In this case, although the order of the documents Gn in the output tray 31 is not maintained, the last switchback feeding operation can be saved, thereby being able to shorten the time necessary to scan the images of both sides of the documents Gn.

Thus, according to the present aspect, the controller 60 cuts off the drive force transmission to the pick-up roller 33 and separation roller 34 at a timing which is not only before the feed-direction leading end of the document G1 being fed along the feed path 32 arrives at the scanning position but also before the feed-direction leading end side of the document G2 is pressure contacted with the separation roller 34 and the feed-direction leading end of the document G2 is fed by the feed roller 35 and its associated pinch roller 37 respectively disposed at the most-upstream position of the feed path 32. Thus, in the switchback feeding operation, even when the leading end of the document G1 projected from the bidirectional feed path 39 is contacted with the document G2 existing on the input tray 30, the placement state of the document G2 is maintained.

What is claimed is:

1. A document feeder comprising:
   an inlet;
   an outlet;
   a feeding system configured to feed a document from the inlet, the feeding system including a pick-up element and a separation element, wherein the pick-up element is configured to pick up a document placed on the inlet to the separation element, and the separation element is configured to nip the document picked up by the pick-up element to feed the document;
   a transfer system including transfer elements configured to transfer the document fed by the feeding system to the outlet;
   an input transfer path configured to guide the document during transfer from the inlet passed a scanning point to an end point positioned above the inlet;
   an output transfer path configured to guide the document during transfer from the end point passed the scanning point to the outlet; and
   a drive system configured to drive the feeding system and the transfer elements of the transfer system,
   wherein the drive system drives the feeding system and the transfer system to feed and transfer a first document from the inlet, and, while the first document is transferred by the transfer system, cuts off a driving force to the feeding system when the separation element of the feeding system nips a second document fed subsequently to the first document.

2. A document feeder according to claim 1, an intermediate transfer path configured to guide the document during transfer from the end point passed the scanning point to the end point again, wherein the document is guided along the intermediate transfer path after being guided along the input path and prior to being guided along the output transfer path.

3. A document feeder according to claim 1, further comprises a sensor disposed in the input transfer path;
   wherein the drive system controls the feeding system in accordance with the sensor detecting a leading end of the document.

4. A document feeder according to claim 1, wherein the drive system cuts off a driving of the secondary system.

5. A document feeder according to claim 1, wherein the separation element nips the document placed on the inlet before a leading end of the first document reaches the scanning point.

6. A document feeder according to claim 1, wherein the drive system includes a motor that rotates feed rollers included in the transfer system in a first direction irrespective of a rotational direction of the motor.

7. A feeder according to claim 1, wherein the drive system includes a single motor for driving the feeding system and the transfer system.

8. A document feeder according to claim 7, further comprising a sensor disposed upstream of the scanning point and configured to detect a presence of a document,
   wherein a distance from the inlet to the second sensor is longer than a maximum document length of which both sides can be scanned.

9. An automatic document feeder comprising:
   an inlet;
   an outlet;
   a transfer system configured to transfer a document from the inlet to the outlet;
   an input transfer path configured to guide the document during transfer from the inlet passed a scanning point to an end point positioned above the inlet;
   an output transfer path configured to guide the document during transfer from the end point passed the scanning point to the outlet;
   a secondary system configured to feed the document from the inlet; and
   a drive system configured to drive the transfer elements and the secondary system,
   wherein the drive system controls the transfer system such that, in at least some instances, operation of the secondary system is independent of operation of the transfer system,
   wherein the drive system cuts off a driving of the secondary system,
   wherein the drive system includes a single motor for driving the feed system and the supply system, and
   wherein a distance from the inlet to the second sensor is longer than a maximum document length of which both sides can be scanned.

10. A document feeder comprising:
    an input tray;
    an output tray;
    a feed path connecting the input tray and the output tray though an image reading point;
    a switchback path connected to the feed path at a position between the output tray and the image reading point, and extending above the input tray;
    a pick-up unit configured to pick up documents placed on the input tray sequentially by pressure contacting with the documents;
    a separation unit provided at downstream of the pick-up unit in a feeding direction, and configured to separate the documents picked up by the pick-up unit one by one;
    a feeding unit provided at a downstream of the separation unit in the feeding direction, and configured to feed the document separated by the separation unit toward the output tray;

a switchback feeding unit configured to feed a document to the switchback path, reverse a leading end and a trailing end of the document, and feed the document to the feed path at a position between the image reading point and the input tray;

a drive source configured to supply driving force to the pick-up unit, the separation unit and the feeding unit;

a controller configured to:

cause driving force from the drive source to be transmitted to the pick-up unit, the separation unit and the feeding unit to feed a first document to the feed path from the input tray, cut off the transmission of the driving force from the drive source to the separation unit by reversing a rotation direction of the drive source at a timing when a leading end of a second document fed subsequently to the first document is nipped by the separation unit and before a leading end of the first document reaches the image reading point, and while the transmission of the driving force to the separation unit is cut off, cause driving force from the driver source to be transmitted to the feeding unit to feed the first document to the image reading point.

11. A document feeder according to claim 10, further comprising:

a first sensor provided at a downstream of the separation unit in the feeding direction, and configured to detect a presence of a document; and a second sensor provided an upstream of the image reading point, and configured to detect a presence of a document, wherein the controller determines the timing when the leading end of the second document is nipped by the separation unit based on a detection of the first sensor, and before the leading end of the first document reaches the image reading point based on a detection of the second sensor.

12. A document feeder according to claim 11, wherein the distance from the separation unit and the second sensor is longer than a maximum document length of which both sides can be read.

* * * * *